(12) United States Patent
Flamm et al.

(10) Patent No.: US 12,555,973 B2
(45) Date of Patent: Feb. 17, 2026

(54) APPARATUS, LASER SYSTEM AND METHOD FOR COMBINING COHERENT LASER BEAMS

(71) Applicant: TRUMPF Laser GmbH, Schramberg (DE)

(72) Inventors: Daniel Flamm, Ludwigsburg (DE); Andreas Heimes, Renningen (DE); Maike Prossotowicz, Aichhalden (DE)

(73) Assignee: TRUMPF LASER GMBH, Schramberg (DE)

( * ) Notice: Subject to any disclaimer, the term of this patent is extended or adjusted under 35 U.S.C. 154(b) by 807 days.

(21) Appl. No.: 17/863,420

(22) Filed: Jul. 13, 2022

(65) Prior Publication Data

US 2022/0360036 A1 Nov. 10, 2022

Related U.S. Application Data

(63) Continuation of application No. PCT/EP2021/050461, filed on Jan. 12, 2021.

(30) Foreign Application Priority Data

Jan. 15, 2020 (DE) ...................... 10 2020 200 444.7

(51) Int. Cl.
*H01S 3/10* (2006.01)
*G02B 27/10* (2006.01)
(Continued)

(52) U.S. Cl.
CPC ........ *H01S 3/2383* (2013.01); *G02B 27/1086* (2013.01); *H01S 3/005* (2013.01); *H01S 3/10053* (2013.01); *H01S 3/1307* (2013.01)

(58) Field of Classification Search
CPC .... H01S 3/2383; H01S 3/005; H01S 3/10053; H01S 3/1307; H01S 3/06754;
(Continued)

(56) References Cited

U.S. PATENT DOCUMENTS 6,708,003 B1 * 3/2004 Wickham ........... H04B 10/1121
398/161
7,756,169 B2 7/2010 Livingston et al.
(Continued)

FOREIGN PATENT DOCUMENTS

| CN | 109863445 A | 6/2019 |
| DE | 102018211971 A1 | 1/2020 |
| DE | 102020200444 A1 | 7/2021 |

OTHER PUBLICATIONS

Zimmermann, et al., "Microlens Laser Beam Homogenizer: From Theory to Application," *Proceedings of SPIE* 6663, pp. 1-13 , Sep. 13, 2007, SPIE, Bellingham, WA, USA.
(Continued)

*Primary Examiner* — Xinning(Tom) Niu
(74) *Attorney, Agent, or Firm* — LEYDIG, VOIT & MAYER, LTD.

(57) ABSTRACT

An apparatus for combining a plurality of coherent laser beams includes a splitting device configured to split an input laser beam into the plurality of coherent laser beams, a plurality of phase setting devices configured to adjust a respective phase of one of the plurality of coherent laser beams, and a beam combining device configured to combine the plurality of coherent laser beams, which emanate from a plurality of grid positions of a grid arrangement. The beam combining device includes a microlens arrangement having at least two microlens arrays. The apparatus further includes a controller configured to adjust a respective phase of a respective one of the plurality of coherent laser beams and/or vary a respective phase of a respective one of the plurality of coherent laser beams.

19 Claims, 5 Drawing Sheets

(51) Int. Cl.
*H01S 3/00* (2006.01)
*H01S 3/13* (2006.01)
*H01S 3/23* (2006.01)

(58) Field of Classification Search
CPC ... H01S 3/0071; G02B 27/1086; G02B 26/06; G02B 27/1093; G02B 27/123
See application file for complete search history.

(56) References Cited

U.S. PATENT DOCUMENTS

| | | | |
|---|---|---|---|
| 9,851,571 | B1 | 12/2017 | Zhang et al. |
| 2007/0201795 | A1* | 8/2007 | Rice .................... H01S 3/005 385/39 |
| 2008/0253415 | A1* | 10/2008 | Livingston ............ H01S 3/2383 372/38.01 |
| 2009/0003392 | A1* | 1/2009 | Spinelli .................. H01S 3/117 372/13 |
| 2009/0180498 | A1* | 7/2009 | Schmidt ................. H01S 3/005 372/21 |
| 2013/0107343 | A1 | 5/2013 | Shekel |
| 2018/0269648 | A1 | 9/2018 | Robinson et al. |
| 2021/0165135 | A1 | 6/2021 | Tillkorn et al. |
| 2022/0360036 | A1 | 11/2022 | Flamm et al. |

OTHER PUBLICATIONS

Zimmermann, Maik, et al, "Refractive Micro-optics for Multi-spot and Multi-line Generation," Proceedings of LPM2008—the 9th International Symposium on Laser Precision Microfabrication, 2008, pp. 1-5.

* cited by examiner

APPARATUS, LASER SYSTEM AND METHOD FOR COMBINING COHERENT LASER BEAMS

CROSS REFERENCE TO RELATED APPLICATIONS

This application is a continuation of International Application No. PCT/EP2021/050461 (WO 2021/144250), filed on Jan. 12, 2021, and claims benefit to German Patent Application No. DE 10 2020 200 444.7, filed on Jan. 15, 2020. The aforementioned applications are hereby incorporated by reference herein.

FIELD

The disclosure relates to an apparatus for combining a plurality of coherent laser beams, comprising: a splitting device for splitting an input laser beam into the plurality of coherent laser beams, a plurality of phase setting devices for adjusting a respective phase of one of the coherent laser beams, and a beam combining device for combining the coherent laser beams, which emanate from a plurality of grid positions of a grid arrangement, the beam combining device comprising a microlens arrangement having at least two microlens arrays. The disclosure also relates to a method for combining a plurality of coherent laser beams, in particular via such an apparatus, comprising: input coupling the plurality of coherent laser beams emanating from a plurality of grid positions arranged in a grid arrangement into a microlens arrangement having at least two microlens arrays, and combining the coherent laser beams in the microlens arrangement.

BACKGROUND

U.S. Pat. No. 2,013,010 7343 A1 describes a laser system which comprises a laser source in the form of a seed laser and an optical gain system which produces an amplified laser output. The laser system may contain a phase control circuit having a phase modulation functionality for a plurality of optical amplifiers, which comprises a sensor for measuring the overall output intensity of the optical amplifiers. The phase control circuit can change the phase or relative phase relationship between individual optical amplifiers from the total thereof in order to maximize the overall output intensity of the optical amplifiers. The laser system can contain a coherent far-field combination means for combining the output of the optical amplifiers, which comprises a pair of microlens arrays.

In the case of such a coherent beam combination, a plurality of laser beams which emanate from a plurality of grid positions of the grid arrangement are superposed to form a combined laser beam, which has a correspondingly higher power. Such a beam combination can be implemented—virtually without loss of beam quality—diffractively, reflectively, for example by way of a segmented mirror, interferometrically or by way of polarization coupling.

Very different laser application processes, e.g., additive manufacturing, marking, and welding (both micro-welding and medical welding) or laser switching processes in laser networks, require a fast deflection of the focal position of the laser beam (scanning) and/or the spilt of a laser beam for an alignment with a plurality of focal positions (beam splitting).

SUMMARY

In an embodiment, the present disclosure provides an apparatus for combining a plurality of coherent laser beams. The apparatus includes a splitting device configured to split an input laser beam into the plurality of coherent laser beams, a plurality of phase setting devices configured to adjust a respective phase of one of the plurality of coherent laser beams, and a beam combining device configured to combine the plurality of coherent laser beams, which emanate from a plurality of grid positions of a grid arrangement. The beam combining device includes a microlens arrangement having at least two microlens arrays. The apparatus further includes a controller configured to adjust a respective phase of a respective one of the plurality of coherent laser beams on the basis of an arrangement of the plurality of respective grid position within the grid arrangement in order to combine the plurality of coherent laser beams to form at least one combined laser beam that is diffracted into an order of diffraction that differs from the zeroth order of diffraction, and/or vary a respective phase of a respective one of the plurality of coherent laser beams based on an arrangement of the plurality of respective grid position within the grid arrangement in order to change an order of diffraction into which at least one combined laser beam is diffracted.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figures 1A, 1B, 1C:
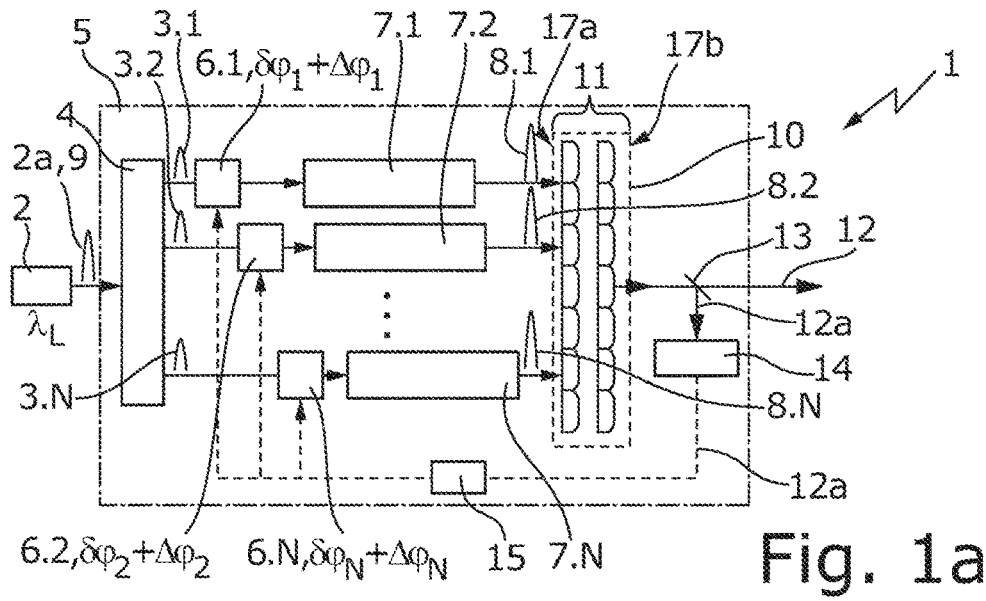
FIG. 1a shows a schematic representation of a laser system having an apparatus for combining a plurality of coherent laser beams, which are amplified in a plurality of gain fibers.
FIG. 1b shows a schematic representation of the laser system analogous to FIG. 1a, wherein an amplified seed laser beam is supplied to the apparatus.
FIG. 1c shows a schematic representation of a laser system analogous to FIG. 1b, having a further apparatus for combining coherent laser beams which serves to amplify the seed laser beam.

The present disclosure is based on the object of providing an apparatus, a laser system, and an associated method for combining coherent laser beams, which allow virtually complete maintenance of the beam quality during the combination and which simultaneously facilitate a fast deflection of a combined laser beam and/or a splitting of the beam of a combined laser beam with a specified division of the input power.

Within the meaning of this application, "coherent laser beams" is to be understood in the context of a temporal coherence of the laser beams. In general, the laser beams may have a reduced degree of spatial coherence, that is to say the laser beams can be spatially partially coherent, that is to say this does not necessarily relate to single mode laser beams. By way of example, the laser beams can be produced by multi-mode sources and can for example form a higher-mode Gaussian mode, e.g., a Laguerre-Gaussian mode, a Hermite-Gaussian mode or superpositions thereof. However, the laser beams are preferably coherent both in time and space.

According to the disclosure, an apparatus of the type set forth at the outset, which comprises a control device designed or programmed to adjust the phase of a respective coherent laser beam on the basis of an arrangement of the respective grid position within the grid arrangement in order to combine the coherent laser beams to form at least one laser beam that is diffracted into an order of diffraction that differs from the zeroth order of diffraction and/or designed or programmed to vary the respective phase of one of the coherent laser beams on the basis of an arrangement of the respective grid position within the grid arrangement in order to change an order of diffraction into which the at least one combined laser beam is diffracted.

In principle, the grid positions of the grid arrangement can be formed along a straight line or curve (one-dimensional grid arrangement) or along a plane or curved surface (two-dimensional grid arrangement). Along the grid arrangement, the coherent laser beams are separated or spaced apart from one another to such an extent that the desired fill factor is obtained. The grid positions of the grid arrangement can be formed at the end faces of fibers (emission areas) or of other emitters, from where a respective coherent laser beam is emitted. In this case, the fibers, more precisely their end faces, are arranged in a grid arrangement and the grid positions correspond to the emission areas on the end faces of the fibers. However, the grid positions of the grid arrangement may also correspond to the near field or the far field of the emission areas, that is to say the grid positions can be arranged along a curve or an area in space on which the emission surfaces are imaged such that the spatial distribution of the grid positions corresponds to the—optionally scaled—spatial distribution of the emission areas.

Consequently, the grid arrangement forms a curve or an area in space, along which there is a desired distance between the grid positions or the coherent laser beams. By way of example, if a Fourier lens is used to input couple the coherent laser beams (see below), the desired distance is present in the focal plane of the Fourier lens.

U.S. Pat. No. 2,013,010 7343 A1, cited at the outset, has disclosed the practice of using a (micro)lens arrangement as a beam combining device for the coherent combination of a plurality of coherent laser beams to form a combined laser beam. DE 10 2018 211 971.6 or PCT/EP2019/069324 has described how the phases or the phase differences (fundamental phases) between the coherent laser beams should be chosen in the case of a microlens arrangement as a beam combining device in order to produce a combined laser beam with an optimized, high beam quality. How the microlens arrangement should be optimized in view of its parameters (pitch of the microlenses, focal length of the microlenses of the microlens arrangement, spacing of the microlens arrays, . . . ) in order to produce a combined laser beam with an optimized beam quality is also specified there.

In respect of the phases or the phase differences of the coherent laser, the disclosure proposes to deviate, in a targeted fashion, from the phases for the combination that is optimized in view of the beam quality for diffracting into the zeroth order of diffraction, in order to carry out a controlled beam deflection or controlled beam split.

In this case, the phase of the respective coherent laser beam is adjusted individually with the aid of the control device and on the basis of the arrangement of the grid position of the grid arrangement assigned to the respective coherent laser beam so that the coherent laser beams are no longer combined to form a single or individual laser beam but are combined into two or more well-defined bundles or into two or more combined laser beams, which are diffracted with a defined power distribution or power division into different orders of diffraction (beam splitting) or are diffracted into a single laser beam which has an order of diffraction that differs from the zeroth order of diffraction (beam deflection).

The proposed approach is based on the concept of the optical phase array (OPA), in the case of which a set of absolute phases of the one-dimensional or two-dimensional grid arrangement of the coherent laser beams is chosen such that there is constructive interference at well-defined orders of diffraction. In the case of a one-dimensional or two-dimensional grid arrangement (array), the phases of the coherent laser beams to be combined can be chosen such that it is possible to add or remove individual combined laser beams, groups of combined laser beams or an entire array of combined laser beams, which corresponds to a set of orders of diffractions, in a targeted manner. For a respective desired group of combined laser beams intended to be produced by the apparatus, it is possible for example to choose a suitable set of (absolute) phases by means of an iterative optimization algorithm in order to activate or deactivate the diffraction to certain orders of diffraction. In this way it is possible to realize a variable beam split or deflection and power division. The iterative optimization algorithm can be a stochastic or randomized algorithm, for which a homogeneous power division or intensity distribution is specified as start values for example.

The phase setting devices serve to adjust the respective phase of the coherent laser beams and may be arranged at any desired location in front of the microlens arrangement where the coherent laser beams are separated from one another and no longer overlap. These phase setting devices are required, inter alia, because, e.g., thermal effects, vibrations or else air turbulence lead to the optical path length differences in the individual channels. There are a number of options for realizing the phase setting devices, which are typically designed to set a variable phase lag: By way of example, the phase setting devices can be modulators in the form of EOMs (electro-optic modulators, for example in the form of liquid crystals), SLMs (spatial light modulators), optical retardation paths in the form of the mirror arrangements, electromechanical modulators, for example in the form of piezo-mirrors, or the like. In the case where the coherent laser beams are guided in a fiber on the beam path from the grid arrangement, it is possible to apply a tensile stress to the fiber, for example by means of piezo actuators, for the purposes of adjusting the phase; it is also possible to influence the temperature of the fiber, etc. The control device can be realized in the form of hardware and/or software, for example in the form of a microcontroller, an FPGA, an ASIC, etc. The control device is designed to suitably act on the phase setting devices, for example by way of suitable electronic (control) signals.

The splitting device for splitting the input laser beam can for example be a conventional 1-to-N coupling device, for example in the form of one or more microlens arrays, a fiber splitter, a plurality of series-connected beam splitter cubes, polarization beam splitters, a diffraction grating for splitting the beam, etc. The input laser beam can be a seed laser beam produced by a laser source or the input laser beam can be produced from a seed laser beam of a laser source, for example by way of a split and coherent combination.

Alternatively, a plurality of laser sources, for example in the form of fiber oscillators, laser diodes, etc., may also serve to produce a plurality of coherent laser beams such that a splitting device can be dispensed with. In this case, a laser system containing the at least one laser source comprises a control device for driving the laser diodes or the laser sources in order to produce the coherent laser beams. The laser source(s) can be designed to produce ultrashort pulse laser beams, that is to say coherent laser beams which have a pulse duration of less than $10^{-12}$ s, for example.

The coherent laser beams produced in the laser source or sources can be guided to the grid arrangement with the aid of a plurality of beam guiding devices for example in the form of fibers. The individual beam guidance of the laser beams renders it possible to act thereon on an individual basis, in order to suitably set the relative phases with the aid of the phase setting devices. The beam guiding devices may comprise an appropriate number of amplifiers or amplifier chains, for example in the form of fiber amplifiers, in order to amplify the laser beams before these are emitted in the direction of the microlens arrangement from the grid positions. The phase setting devices can be arranged upstream of the beam guiding devices or downstream of the beam guiding devices in the beam path, and/or can act on the beam guiding devices for example in the form of fibers. Alternatively, following the split in the splitting device, the coherent laser beams can reach the grid arrangement by way of free beam propagation, said grid arrangement for example being able to be located in the focal plane of the Fourier lens or at any other location where the coherent laser beams are spaced apart from one another to a sufficient degree. In the focal plane of such a Fourier lens or at the other location, the coherent laser beams have the desired fill factor, that is to say a desired ratio between the extent or beam diameter of the respective laser beams in a respective spatial direction and the distance between the centers of adjacent laser beams.

The control device can be designed to vary the respective phase of the coherent laser beams for the purposes of changing an order of diffraction into which the at least one combined laser beam is diffracted. In this way it is possible to realize an extremely quick, discrete scanning process, within the scope of which the at least one diffracted laser beam jumps or is moved back and forth between different orders of diffraction. In this case, the apparatus can serve as a scanner device or as a beam shaping unit.

The scanning process can be carried out using a laser beam that is diffracted into a single order of diffraction, but it is also possible to realize a discrete scanning process using a laser beam that is split among two or more orders of diffraction (at most $\pm(N-1)/2$ orders of diffraction), that is to say using two or more combined laser beams. In this case, the phase relationship or the phase of a respective coherent laser beam required to diffract or split the combined laser beam into at least two different orders of diffraction can be set. By varying the phase of the coherent laser beams, it is possible to change the power distribution among the various orders of diffraction into which the at least two combined laser beams are diffracted. In this way it is possible to implement a discrete scanning process with a number of combined laser beams, with the scan field being between the $-((N-1)/2)$-th order of diffraction and the $(N-1)/2$-th order of diffraction and N denoting the number of coherent laser beams.

The control device can set or vary the respective phase of the coherent laser beams on the basis of a parameter table stored in a memory device in order to move the at least one combined laser beam along a specified (discrete) trajectory. The respective phases to be set can also be specified to the control device from the outside, for example by a user, or the phases to be set can be specified or varied on the basis of at least one measured variable which is measured for example with the aid of a sensor arrangement, that is to say there can be closed-loop control of the phases to a respective target value. In the beam combination described here, in the case of which the at least one combined laser beam or at least one combined laser beam is not diffracted into the zeroth order of diffraction, it is generally required to use a sensor array or optionally a spatially resolving sensor for the phase detection.

In the case where the combined laser beam is imaged by means of a lens or an imaging optical unit, the (at least one) combined laser beam no longer propagates along the optical axis but with a parallel offset from the optical axis. The magnitude of the parallel offset of the combined laser beam depends on the higher order of diffraction ($\pm 1$, $\pm 2$, etc.), into which said combined laser beam is diffracted. In the case where the grid positions are arranged in a two-dimensional grid arrangement, the (at least one) combined laser beam can thus be offset in two typically perpendicular directions parallel to the optical axis.

It was found that analytic relationships can be found for the choice or definition of the phases of the coherent laser beams in the case of discrete scanning in special cases, said analytic relationships being reproduced below.

In an embodiment the control device is designed to adjust the respective phase of one of the coherent laser beams, the phase being composed of a respective additional phase and a respective fundamental phase, at which the beam combining device combines the coherent laser beams to form a single laser beam that is diffracted into the zeroth order of diffraction or into an order of diffraction that differs from the zeroth order of diffraction. The additional phase facilitates a split of the combined laser beam into two or more orders of diffraction or a change in the order of diffraction into which the combined laser beam is diffracted. Preferably, the fundamental phase is chosen so that the beam combining device combines the coherent laser beams into the zeroth order of diffraction.

In a development the grid positions are arranged spaced apart in a first direction and the control device is designed, for the purposes of combining the coherent laser beams to form a single combined laser beam that is diffracted into an order of diffraction $B_{k,x}$ that differs from the zeroth order of diffraction, to set the respective additional phase $\Delta\varphi_a$ of a coherent laser beam at an a-th grid position in the first direction which is given by:

$$\Delta\varphi_a = -(2\pi/N)(a-(N+1)/2)B_{k,x}$$

where N denotes a number of the grid positions arranged in the first direction and $B_{k,x}$ denotes a positive or negative integer (±1, ±2, etc.). The absolute value of $B_{k,x}$ (or the order of diffraction) is typically no greater than (N−1)/2. In principle, the assumption is made below that the fundamental phase is chosen such that there is a combination of the laser beam into the 0th order of diffraction.

In the first direction, the grid positions are arranged at the same distance from one another (equidistantly). In this case, the grid positions can be arranged along a line that extends in the first direction, that is to say the beam emergence directions or the Poynting vectors of the coherent laser beams are aligned parallel to one another. Alternatively, the grid positions can also be arranged equidistantly from one another on a circular arc, for example, which extends in or along the first direction.

In a development of this embodiment the grid positions of the grid arrangement are additionally arranged in a second direction that is perpendicular to the first direction and the control device is designed, for the purposes of combining the coherent laser beams to form a single combined laser beam that is diffracted into an order of diffraction $B_{k,x}$ in the first direction that differs from the zeroth order of diffraction and into an order of diffraction $B_{k,y}$ in the second direction that the differs from the zeroth order of diffraction, to set an additional phase $\Delta\varphi_{a,b}$ of a coherent laser beam at an a-th grid position in the first direction and at a b-th grid position in the second direction which is given by:

$$\Delta\varphi_{a,b} = -((2\pi/N)(a-(N+1)/2)B_{k,x} + (2\pi/M)(b-(M+1)/2)B_{k,y}))$$

where M denotes a number of the grid positions in the second direction and $B_{k,y}$ denotes a positive or negative integer. The additional phase $\Delta\varphi_{a,b}$ is set at an a-th grid position in the first direction, which simultaneously forms a b-th grid position in the second direction. In the case where the grid positions in the grid arrangement are arranged only in the first direction the coherent laser beams are combined to form a single laser beam which is diffracted into the zeroth order of diffraction in the second direction (i.e., $B_{k,y}=0$). Consequently, the formula for the additional phase specified further above arises for the one-dimensional case $\Delta\varphi_a$.

In this development, a plurality of N×M laser beams, rather than a one-dimensional coherent combination of a laser beams, are combined in two dimensions to form one or more laser beams. In this case, the grid positions are arranged in a two-dimensional grid arrangement, with the distances between adjacent grid positions typically being the same in both directions if the number of grid positions is the same in both directions (i.e., N=M) or—should N not equal N—being chosen to be different. In this case, the grid or the grid arrangement with the grid positions can extend in a plane (e.g. XY-plane) or on a curved surface, for example on a spherical shell. The laser beams emanating from the grid positions are typically aligned in parallel in the first case and can in the second case be aligned in the direction of the center of the spherical shell, where the microlens arrangement is arranged.

In this case, the periodicity of the grid with a grid positions specifies the pitches of the microlenses in two different, for example perpendicular directions (X, Y). In this case, it is possible to use 2-dimensional microlens arrays whose pitches $p_x$, $p_Y$ optionally differ in the two perpendicular directions X, Y on the basis of the periodicity of the grid. Accordingly, the microlenses of the 2-dimensional microlens array optionally have different curvatures in the X-direction and in the Y-direction, that is to say these are not cylindrical lenses. It is also possible to replace a respective 2-dimensional microlens array with two 1-dimensional microlens arrays with cylindrical lenses, with the cylindrical lenses of the 1-dimensional microlens arrays being aligned perpendicular to one another.

The relationship between the 2-dimensional grid with the grid positions and the 2-dimensional microlens array is analogous to the relationship between the Bravais lattice and the reciprocal lattice. Accordingly, the arrangement of the grid positions can also correspond to the highest density packing, that is to say a hexagonal lattice. The microlenses of the microlens array are likewise arranged in a hexagonal arrangement in this case.

In the case where the grid positions are arranged at the same distances from one another (equidistantly) in a first direction X, the following arises for the fundamental phases $\delta\varphi_a$ which produce a laser beam that is diffracted into the $B_{k,x}$-th order of diffraction in the first direction X:

$$\delta\varphi_a = -\pi/N(m_a + B_{k,x})^2,$$

where the following applies for the running index $m_a$:

$$m_a = -\frac{(N+1)}{2} + a$$

where a=1, . . . , N, and $B_{k,x}$ denotes an integer between −((N−1)/2) and (N−1)/2, which corresponds to the respective order of diffraction in the first direction.

For the above-described case where the grid positions are additionally arranged along a second direction Y, which is preferably perpendicular to the first, the following arises for the fundamental phases $\delta\varphi_{a,b}$ which produce a laser beam that is diffracted into the $B_{k,x}$-th order of diffraction in the first direction X and a laser beam that is diffracted into the $B_{k,y}$-th order of diffraction in the second direction Y:

$$\delta\varphi_{a,b} = -\pi/N(m_a + B_{k,x})^2 - \pi/M(m_b + B_{k,y})^2,$$

where the following applies for the running index $m_b$:

$$m_b = -\frac{(M+1)}{2} + b$$

where b=1, . . . , M, with M as above denoting the number of grid positions arranged in the second direction and where $B_{k,y}$ denotes an integer between −((M−1)/2) and (M−1)/2, which corresponds to the respective order of diffraction in the second direction.

Observing the aforementioned conditions for the additional phases $\Delta\varphi_a$ or $\Delta\varphi_{a,b}$ and for the fundamental phases $\delta\varphi_a$ or $\delta\varphi_{a,b}$ facilitates a deflection without loss of efficiency. However, it is understood that the aforementioned conditions cannot be exactly observed in practice. The beam quality of the deflected laser beam deteriorates in the case where there is a deviation from the aforementioned conditions. Within the context of this application, the aforementioned conditions are considered satisfied if the right-hand side deviates by no more than 20%, preferably by no more than 10%, in particular by no more than 5% from the value $\Delta\varphi_a$ or $\Delta\varphi_{a,b}$ on the left-hand side, that is to say if the following applies: $|\Delta\varphi_a + 2(\pi/N)(a-(N+1)/2) B_{k,x}| < 0.2$, preferably $<0.1$, in particular $<0.05$. A corresponding statement also applies for $\Delta\varphi_{a,b}$, i.e., $|\Delta\varphi_{a,b}+((2\pi/N)(a-(N+1)/2) B_{k,x}+(2\pi/M)(b-(M+1)/2)) B_{k,y}| < 0.2$, preferably $<0.1$, in particular $<0.05$. A corresponding statement also applies for the fundamental phases $\delta\varphi_a$ or $\delta\varphi_{a,b}$, i.e., $|\delta\varphi_a + \pi/N (m_a + B_{k,x})^2| < 0.2$, preferably $<0.1$, in particular $<0.05$ or $\delta\varphi_{a,b} + \pi/N (m_a + B_{k,x})^2 + \pi/M (m_b + B_{k,y})^2| < 0.2$, preferably $<0.1$, in particular $<0.05$.

In an alternative embodiment the control device is designed to vary the respective additional phase of the coherent laser beams for the purposes of changing a first order of diffraction, into which a first combined laser beam is diffracted, and/or for the purposes of changing a second order of diffraction, into which a second combined laser beam is diffracted. In this embodiment the coherent laser beams are combined by the beam combining device to form at least two diffracted laser beams. To achieve this, the respective (additional) phases of the combined laser beams are suitably chosen, for the purposes of which an iterative, for example stochastic, optimization algorithm can be used in order to vary or set the ($\pm(N-1)/2$-th or zeroth) order of diffraction of the first combined laser beam and the ($\pm(N-1)/2$-th or zeroth) order of the combined second laser beam in a targeted manner. It is understood that variable beam splitting is not restricted to two combined laser beams but can also be performed with more than two combined laser beams.

In a further embodiment the splitting device for splitting an input laser beam into the plurality of coherent laser beams is designed as a further microlens arrangement, preferably with two further microlens arrays, and the control device is designed, for the purposes of combining the coherent laser beams to form a single combined laser beam that is diffracted into an order of diffraction $B_{k,x}$ in the first direction that differs from the zeroth order of diffraction and preferably diffracted into an order of diffraction $B_{k,y}$ in the second direction that differs from the zeroth order of diffraction, to set twice as much as the fundamental phases.

It was found that the values for the fundamental phases $\delta\varphi_a$, $\delta\varphi_{a,b}$ specified in the equations above need to be doubled for the special case that a respective microlens array is used for dividing an input laser beam into the plurality of coherent laser beams and for combining the laser beams. What applies in principle is that a doubling of the fundamental phases is required for the special case of two microlens arrangements, which in particular may have identical designs, in relation to the case where a fiber splitter or any other optical device is used for combination purposes. Consequently, doubling the fundamental phase is not restricted to the equations specified above but applies in general.

In a further embodiment the control device is designed to adjust a respective additional phase of the coherent laser beams for the purposes of producing specified, in particular different powers of the at least two combined laser beams that are diffracted into different orders of diffraction. In particular, the control device can be designed to vary the respective additional phase of one of the coherent laser beams on the basis of an arrangement of the respective grid position of the coherent laser beam within the grid arrangement, in order to change the specified, in particular different power or the power distribution over time.

The input power can be distributed equally among the respective combined laser beams but it is also possible to implement a specified, differing distribution of the input power among the at least two laser beams combined in different orders of diffraction, and optionally to vary this distribution over time.

In the case where the coherent laser beams are combined to form a first combined laser beam that is diffracted into the zeroth order of diffraction and a second combined laser beam that is diffracted into the $\pm 1$st order of diffraction in the first direction, the input power p can for example be split among the 0th and the $\pm 1$st order of diffraction as follows: $p_0 = C p$; $p_{\pm 1} = (1-C) p$, where $0 < C < 1$. For the two cases of $C=1$ and $C=0$, respectively, only one combined laser beam is produced, which is diffracted into the 0th or into the $\pm 1$st order of diffraction. In the case of $C=0.5$, half of the input power p is diffracted into the 0th order of diffraction and the other half is diffracted into the $\pm 1$st order of diffraction.

For the additional phase of a respective coherent laser beam at an a-th grid position in the first direction, which produces the aforementioned power distribution with a factor C, the following applies:

$$\Delta\varphi_a = C(2\pi/N)(a-(N+1)/2),$$

where a component of the input power p is diffracted into the $-1$st order of diffraction for a positive sign in the equation above and a component of the input power is diffracted into the $+1$st order of diffraction for a negative sign in the equation above. The equation above can be generalized to the two-dimensional case in a manner analogous to the aforementioned equations for the additional phase $\Delta\varphi_a$, with the following formula arising for the additional phase $\Delta\varphi_{a,b}$:

$$\Delta\varphi_{a,b} = C(2\pi/N)(a-(N+1)/2)C(2\pi/M)(b-(M+1)/2).$$

The factor C can be chosen to be constant or can be varied over time. In the latter case, the apparatus can be operated in the style of an acousto-optic or electromechanical component in the form of deflectors or modulators. The formulae above for the additional phase apply generally for the case where the input power is intended to be split between two immediately adjacent orders of diffraction. For the case where the fundamental phase is set such that there is a diffraction of the coherent laser beams into the $+1$st order of diffraction, the input power is split between the $+1$st order of diffraction and the $+2$nd order of diffraction.

In the case of a number M of more than two combined laser beams, the split can for example be realized in the form of a (linear) power ramp, in the case of which a first combined laser beam is diffracted with a maximum power $p_{k,max}$ into the k-th order of diffraction and the remaining $M-1$ combined laser beams are diffracted into the remaining $M-1$ orders of diffraction with a power that has been reduced in relation to the maximum power $p_{k,max}$. By way of example, for the power distribution in the form of a power wedge, the following may apply: $a/M\ p_{k,max}$, where $a = 1, \ldots, M$. For the example of a total of five diffracted combined laser beams, proportions of the maximum power $p_{k,max}$ of 100%, 80%, 60%, 40% and 20% arise.

In a further embodiment, the grid positions in the grid arrangement are arranged in a first direction, and the coherent laser beams and the microlens arrangement satisfy the following condition:

$$N = p_x^2/(\lambda_L f_E), \quad (1)$$

where N denotes a number of the grid positions arranged in the first direction, $p_x$ denotes a pitch of the microlenses of a respective microlens array in the first direction, $\lambda_L$ denotes the laser wavelength, and $f_E$ denotes a focal length of the microlens arrangement. In the simplest case, the microlens arrangement comprises two microlens arrays with an identical focal length, said microlens arrays being arranged at a distance of their focal lengths from one another. In this case, the focal length of the microlens arrangement corresponds to the (common) focal length of the two microlens arrays.

In the case where an even number N of coherent laser beams are intended to be combined in one direction, it is typically required to eliminate the 0th order of diffraction in the beam combining device. To this end, use can for example be made of a phase shifting device, for example in the form of a phase shifting element, which suppresses the 0th order of diffraction by destructive interference, or one of the microlens arrays can be displaced relative to the other microlens array, laterally or transversely to the propagation direction of the combined laser beam, for this purpose, as described in DE 10 2018 211 971.6 or PCT/EP2019/069324, the entirety of which is incorporated in the content of this application by reference. In principle, it is also possible to use the phase setting devices to adjust the respective phases of the coherent laser beams so that the 0th order of diffraction is eliminated.

In the case where the grid positions in the grid arrangement are additionally arranged in a second direction that is preferably perpendicular to the first, the coherent laser beams and the microlens arrangement typically additionally satisfy the following condition:

$$M = p_Y^2/(\lambda_L f_E), \quad (2)$$

where M denotes a number of the grid positions arranged in the second direction and $p_Y$ denotes a pitch of the microlenses of the respective microlens array in the second direction.

The inventors have recognized that the beam quality of an individual coherent laser beam is virtually fully maintained during the combination to form a combined laser beam if equations (1) and/or (2) above are satisfied. What is exploited here is that a microlens arrangement or an imaging homogenizer which is irradiated by a coherent, collimated laser beam produces a diffraction pattern with N diffraction spots of the same intensity should equation (1) be satisfied, cf. the article "Refractive Micro-optics for Multi-spot and Multi-line Generation" by M. Zimmermann et al., Proceedings of LPM2008—the 9th International Symposium on Laser Precision Microfabrication. The inventors propose to reverse the beam path through the imaging homogenizer and to arrange the grid positions, from which the coherent laser beams emanate or are emitted in the direction of the microlens arrangement, where the diffraction spots are produced in the cited article. If the coherent laser beams have (approximately) the same intensity, a combined, coherent laser beam with a high beam quality is produced when the beam direction is reversed.

It is understood that equation (1) cannot be exactly observed in practice. The beam quality of the superposed laser beam deteriorates in the case where there is a deviation from equation (1). Within the context of this application, equation (1) is considered satisfied if the right-hand side of equation (1) deviates by no more than 20%, preferably by no more than 10%, in particular by no more than 5% from the (integer) value N on the left-hand side of equation (1), that is to say if the following applies: $|N - p_x^2/(\lambda_L f_E)| < 0.2$, preferably <0.1, in particular <0.05. A corresponding statement also applies to the equation (2), i.e., $|M - p_y^2/(\lambda_L f_E)| < 0.2$, preferably <0.1, in particular <0.05.

The microlens arrangement may have at least a three microlens arrays and, in particular, may be designed to set its (effective) focal length $f_E$, as described in DE 10 2018 211 971.6 or PCT/EP2019/069324. Setting the focal length of the microlens arrangement is necessary if the number N or M of coherent laser beams used for the combination is changed and equation (1) and/or (2) should still be satisfied since the other parameters in equation (1) and/or (2), that is to say the laser wavelength $\lambda_L$ and the pitch $p_x$ and/or $p_y$ of the microlenses, cannot be readily altered.

In the simplest case, a respective microlens array of the microlens arrangement is realized by a separate multilens array component. However, it is also possible that a plurality of microlens arrays in the beam path are realized by a single microlens array component by virtue of the beam path correspondingly passing through this microlens array component multiple times, for example because the beam path is deflected at the reflecting optical element.

In a further embodiment, the apparatus is designed to input couple coherent laser beams that are adjacent in the first direction into the microlens arrangement with a specified angle difference $\delta\theta$, for which the following applies:

$$\delta\theta = \lambda_L/p_x,$$

where $\lambda_L$ denotes the laser wavelength and $p_x$ denotes a pitch of the microlenses of a respective microlens array in the first direction. To combine the coherent laser beams to form a combined laser beam, it is typically necessary or advantageous for adjacent coherent laser beams to be input coupled into the microlens arrangement with the angle difference $\delta\theta$ specified above. In order to satisfy this condition, the grid positions from where the coherent light beams emanate can be aligned at the respective angle difference $\delta\theta$ with respect to one another and, for example, can be arranged equidistantly on a circular arc. In this case, focusing of the coherent laser beams can be implemented for example with the aid of single lenses or using a further microlens array, which are/is arranged in the respective beam path of one of the coherent laser beams, but the provision of such lenses can optionally also be dispensed with. A corresponding condition applies to the angle difference between adjacent coherent laser beams in the second direction, that is to say the following applies: $\delta\theta = \lambda_L/p_y$. The aforementioned condition is considered satisfied if the following applies: $|\delta\theta - \lambda_L/p_x| < 0.2$, preferably <0.1, in particular <0.05.

In a further embodiment the apparatus comprises an input coupling optical unit for input coupling the coherent laser beams into the microlens arrangement, the input coupling optical unit comprising at least one focusing device, in particular at least one focusing lens, for focusing the plurality of coherent laser beams onto the microlens arrangement. In this case, use is made of an input coupling optical unit which is arranged between the grid positions from which the coherent laser beams emanate and a microlens arrangement. In the case where the beam paths of the coherent laser beams are too long to satisfy the conditions specified above, the input coupling unit may comprise a telescopic optical unit, for example in the form of at least two lenses.

The input coupling optical unit is not mandatory but may be advantageous, for example when setting up the laser system or the apparatus. In particular, the input coupling optical unit can be used to satisfy the aforementioned condition in relation to the angle difference δθ without for this purpose the beam emergence directions of the coherent laser beams at the grid positions having to be aligned at an angle with respect to one another. The use of a focusing lens which is arranged at a distance of substantially its focal length from the microlens arrangement (Fourier lens) was found to be advantageous to this end. In this case, the coherent laser beams can strike the focusing lens with substantially parallel alignment to one another and are focused on the microlens arrangement.

By way of example, the grid positions can be arranged on a line in this case, that is to say the beam emergence directions or the Poynting vectors of the coherent laser beams are aligned parallel to one another. The use or the design of the input coupling optical unit and the arrangement of the grid positions depend on the boundary conditions, for example of the utilized laser source. By way of example, the use of an input coupling optical unit lends itself to the case where the grid positions form the end faces of fibers running in parallel.

In a development, grid positions that are adjacent in the first direction are arranged in a line and have a distance $\delta x$ from one another which is given by $\delta x = \lambda_L f_2/p_x$, where $\lambda_L$ denotes the laser wavelength, $f_2$ denotes the focal length of the focusing device, and $p_x$ denotes a pitch of the microlenses of a respective microlens array in the first direction. In the case where the laser beams run in parallel, the grid positions are typically arranged in a common direction or line (e.g., in the X-direction) which runs perpendicular to the common direction of the beam propagation of the laser beams. In this case, the distance $\delta x$ between the laser beams or grid positions is typically defined by the aforementioned condition. The aforementioned condition is considered satisfied if the following applies: $|\delta x - \lambda_L f_2/p_x| < 0.2$, preferably $<0.1$, in particular $<0.05$.

If the focusing device has a focal length $f_2$, the microlens arrangement, more precisely the first microlens array of the microlens arrangement, is ideally arranged at a distance L2 from the focusing device in the first direction, said distance being given by: $L2 = f_2 - p_x^2/(\lambda_L N)$ or $L2 = f_2 - f_E$. A component of the phase front common to all laser beams or a common phase front curvature of the laser beams incident on the microlens arrangement is set by the deviation of the distance L2 of the microlens arrangement by $px^2/(\lambda_L N)$ from the focal length $f_2$ of the focusing device, so that the coherent laser beams form a combined, single laser beam when passing through the microlens arrangement or through the imaging homogenizer. The condition regarding the distance L2 is also considered fulfilled if the right-hand side deviates from the left-hand side by less than 5%, preferably by less than 2%. In the case where the grid positions are arranged in a two-dimensional arrangement, the following applies analogously to the pitch $p_y$ of the microlenses in the second direction: $L2' = f_2 - p_y^2/(\lambda_L M)$, where M denotes the number of grid positions in the second direction. The distance L2' in the second direction is measured up to the first microlens array which carries out beam shaping in the second direction, and may therefore differ from the distance L2 in the first direction.

A second aspect relates to a laser system, comprising: a seed laser source for producing a seed laser beam, and an apparatus as described above for combining the plurality of coherent laser beams, with the seed laser beam preferably forming the input laser beam of the apparatus. The seed laser source is preferably designed to produce the seed laser beam with a spectral bandwidth of less than 100 nm, particularly preferably less than 50 nm, in particular less than 10 nm, and with a spatial fundamental mode (single mode laser beam). The seed laser beam can be guided to the apparatus either directly or by way of suitable beam-guiding optical elements. Prior to entry into the above-described apparatus, the seed laser beam may be amplified in at least one optical amplifier. Particularly in this case it is possible to optionally completely dispense with the provision of amplifiers, for example in the form of gain fibers, for amplifying the individual coherent laser beams in the apparatus. As a result of amplifying the seed laser beam prior to entry into the apparatus it may optionally be possible to dispense with active closed-loop control of the phases of the individual coherent laser beams. In this case, a static phase—or varying the phase for the targeted modification of the respective order of diffraction—can be set at the respective phase setting device, and need not be corrected. Alternatively, it is possible for the input laser beam itself to be a combined laser beam, as will be described in more detail below.

In an embodiment the laser system additionally comprises a further apparatus for combining a plurality of further coherent laser beams, comprising: a further splitting device for splitting the seed laser beam or the (further) laser input beam into the plurality of further coherent laser beams, a plurality of further phase setting devices for adjusting a respective phase of one of the further coherent laser beams, and a further beam combining device for combining the further coherent laser beams emanating from a plurality of further grid positions of a further grid arrangement, with the further beam combining device comprising a further microlens arrangement having at least two further microlens arrays, and a further control device which is designed to adjust the respective phase of one of the further coherent laser beams on the basis of an arrangement of the respective further grid positions within the further grid arrangement in order to combine the coherent further laser beams to form a laser beam that is diffracted into the zeroth order of diffraction or into an order of diffraction that differs from the zeroth order of diffraction, said diffracted laser beam forming the input laser beam of the splitting device of the apparatus.

In this case, the further control device of the further apparatus is designed or programmed to combine the further coherent laser beams to form a laser beam that is diffracted into the zeroth order of diffraction or into an order of diffraction that differs from the zeroth order of diffraction, by virtue of the fundamental phases described above in conjunction with the apparatus being set.

In this embodiment, a further apparatus for combining a plurality of further coherent laser beams is used to produce the input laser beam for the apparatus described further above. The further apparatus is used in this case to form an amplified combined further laser beam, which forms the input laser beam of the apparatus, from the seed laser beam. In this case it is also possible to optionally completely dispense with the provision of amplifiers within the apparatus, in particular in the beam path downstream of the splitting device. Since an amplified input laser beam is input coupled into the apparatus it is optionally possible to dispense with an active phase adjustment or closed-loop phase control in the apparatus such that the deflection of the at least one combined laser beam in the apparatus is not slowed down by closed-loop phase control. An active stabilization of the phase settings by means of the control loop, which is provided in the further apparatus for combining the further coherent laser beams, is simplified in this case since there only the zeroth order of diffraction needs stabilization.

A further aspect relates to a method of the type set forth at the outset for combining a plurality of coherent laser beams, further comprising: adjusting a respective phase of one of the coherent laser beams on the basis of an arrangement of the respective grid position within the grid arrangement for the purposes of combining the coherent laser beams to form at least one laser beam that is diffracted into an order of diffraction that differs from the zeroth order of diffraction and/or varying the respective phase of the coherent laser beams on the basis of an arrangement of the respective grid position within the grid arrangement in order to change an order of diffraction into which the at least one combined laser beam is diffracted. As a result of varying the phases there can be a highly dynamic, discrete scanning process in one or two directions.

As described above in conjunction with the apparatus, the method for combining the plurality of laser beam deviates in a targeted fashion from the fundamental phases or from phase differences between the coherent laser beams for a combination in the zeroth or in a higher order of diffraction which is optimized in view of beam quality in order to carry out a controlled beam deflection or controlled beam split. In the case of the beam deflection or beam split with suitably chosen additional phases of the individual coherent laser beam there is no loss of efficiency for the respective order of diffraction. The additional phases of the individual coherent laser beams may in particular satisfy the equations for $\Delta\varphi_a$ or for $\Delta\varphi_{a,b}$, which are specified above in the context of the laser system or the apparatus. The fundamental phases $\delta\varphi_a$ and $\delta\varphi_{a,b}$ typically also satisfy the equations described further above in the context of the apparatus.

In a further variant the method comprises: varying the respective additional phases of the coherent laser beams for the purposes of changing a first order of diffraction, into which a first combined laser beam is diffracted, and/or for the purposes of changing a second order of diffraction, into which a second combined laser beam is diffracted, proceeding from a respective fundamental phase at which the beam combining device combines the coherent laser beams to form a single laser beam that is diffracted into the zeroth order of diffraction or into an order of diffraction that differs from the zeroth order of diffraction. As described further above, varying the phases can realize a highly dynamic beam split, in the case of which two, three or optionally more (at most N or N×M) combined laser beams can be produced and/or in the case of which the position or the alignment of at most N−1 or at most (N−1)×(M−1) combined laser beams can be changed. It is understood that the scanning process described above in the context of a single combined laser beam can also be combined with a split among two or more combined laser beams.

In a further variant the method comprises: adjusting a respective additional phase of the coherent laser beams for the purposes of producing specified, in particular different powers of the at least two combined laser beams that are diffracted into different orders of diffraction proceeding from a respective fundamental phase, wherein the beam combining device combines the coherent laser beams to form a single laser beam that is diffracted into the zeroth order of diffraction or into an order of diffraction that differs from the zeroth order of diffraction. As described above in the context of the apparatus, the input power can be distributed equally among the two more combined laser beams but it is also possible to deviate from an equal distribution among the plurality of combined laser beams in a targeted fashion.

As described further above, it is advantageous if the coherent laser beams and the microlens arrangement satisfy the conditions $N=p_x^2/(\lambda_L f_E)$ and $M=p_y^2/(\lambda_L f_E)$ specified above (with an identical focal length $f_E$ being assumed). It is also advantageous if the adjacent coherent laser beams are input coupled into the microlens arrangement with a specified angle difference $\delta\theta_x$ or $\delta\theta_y$, to which the following applies: $\delta\theta_x=\lambda_L/p_x$ or $\delta\theta_y=\lambda_L/p_y$.

Further advantages of the disclosure are evident from the description and the drawing. Likewise, the features mentioned above and those that will be explained further can be used in each case by themselves or as a plurality in any desired combinations. The embodiments shown and described should not be understood as an exhaustive enumeration, but rather are of illustrative character.

In the following description of the drawings, identical reference signs are used for identical or functionally identical components.

FIG. 1a shows an exemplary structure of a laser system 1 which comprises a laser source 2 for producing a seed laser beam 2a. To this end, the laser source 2 comprises a mode-coupled fiber-master oscillator, which produces the seed laser beam 2a at a laser wavelength $\lambda_L$. The seed laser beam 2a of the laser source 2 is fed as an input laser beam 9 to an apparatus 5 for combining a number N of coherent laser beams 3.1, 3.2, . . . , 3.N. The apparatus 5 comprises a conventional 1-to-N splitting device 4, for example in the form of a fiber splitter, in order to split the input laser beam 9, which corresponds to the seed laser beam 2a, into the number N of coherent laser beams 3.1, . . . , 3.N. The coherent laser beams 3.1, . . . , 3.N run through a corresponding number N of phase setting devices 6.1, . . . , 6.N, which allow a respective individual phase $\delta\varphi_a+\Delta\varphi_a$ of the coherent laser beams 3.1, . . . , 3.N (a=1, . . . , N) to be set by virtue of bringing about a suitable phase lag. By way of example, the phase setting devices 6.1, . . . , 6.N can be designed as electro-optic modulators or deflectors, for example using liquid crystals, as acousto-optic modulators or deflectors, as electromechanical modulators or deflectors, for example in the form of actuatable piezo-mirrors, etc.

After the phase setting devices 6.1, . . . , 6.N, the coherent laser beams 3.1, . . . , 3.N run through a corresponding number N of gain fibers 7.1, . . . , 7.N in order to amplify the coherent laser beams 3.1, . . . , 3.N. The end faces of the gain fibers 7.1, . . . , 7.N serve as emission surfaces or form grid positions 8.1, . . . , 8.N at which the coherent laser beams 3.1, . . . , 3.N are emitted. The phase setting devices 6.1, . . . , 6.N may also be arranged downstream of the gain fibers 7.1, . . . , 7.N or may act directly on the gain fiber 7.1, . . . , 7.N, for example by virtue of producing an adjustable mechanical stress on the gain fibers 7.1, . . . , 7.N.

The coherent laser beams 3.1, . . . , 3.N can be deflected to a deflection device with a plurality of deflection mirrors, not depicted here, in order to increase the fill factor, that is to say to reduce the distance between adjacent laser beams 3.1, . . . , 3.N or grid positions 8.1, . . . , 8.N. It is understood that the deflection device is not mandatory. In the example shown, the coherent laser beams 3.1, . . . , 3.N enter a beam combining device 10 when aligned parallel to one another, said beam combining device comprising a microlens arrangement 11 or an imaging homogenizer with two microlens arrays 17a,b for coherently combining the laser beams 3.1, ..., 3.N in order to form a combined laser beam 12 or a plurality of combined laser beams 12a,b (the latter not being shown in FIG. 1a).

It is evident from FIG. 1a that a component 12a of the combined laser beam 12 is output coupled via an output coupling device in the form of a partly transmissive mirror 13 and is incident on a spatially resolving detector 14, for example in the form of a sensor array or a camera. The detector 14 is signal-connected to a control device 15 of the laser system 1, the control device controlling the phase setting devices 6.1, ..., 6.N in order to adjust the individual phases $\delta\varphi_a + \Delta\varphi_a$ of the laser beams 3.1, ..., 3.N on the basis of the properties of the detected component 12a of the combined laser beam 12. The control device 15 can in particular facilitate closed-loop control of the phase setting devices 6.1, ..., 6.N in order to produce desired (target) phases $\delta\varphi_a + \Delta\varphi_a$ of the laser beams 3.1, ..., 3.N on the basis of the properties of the detected component 12a of the combined laser beam 12.

Even though the number N of phase setting devices 6.1, ..., 6.N corresponds to the plurality N of the laser beams 3.1, ..., 3.N in the example shown, a number of N−1 phase setting devices 6.1, ..., 6.N−1 is generally sufficient. In the laser system 1 shown in FIG. 1a, it is possible firstly to attain a high beam quality of, e.g., M=1.3 of the combined laser beam 12 and secondly to attain a significant increase in the power of the laser beams 3.1, ..., 3.N as a result of the gain in the gain fibers 7.1, ..., 7.N.

FIG. 1b shows a laser system 1 which substantially differs from the laser system 1 shown in FIG. 1a in that the coherent laser beams 3.1, ..., 3.N in the apparatus 5 are not amplified with the aid of a plurality of gain fibers 7.1, ..., 7.N or with the aid of other optical amplifiers. Rather, the seed laser beam 2a is amplified in a gain fiber 7 in the laser system 1 shown in FIG. 1b. The amplified seed laser beam 2a is supplied to the apparatus 5 as input laser beam 9. The apparatus 5 of FIG. 1b is designed analogous to the apparatus 5 shown in FIG. 1A, with the difference that the grid positions 8.1, ..., 8.N of the coherent laser beams 3.1, ..., 3.N are not formed at the end faces of the gain fibers 7.1, ..., 7.N (not present in FIG. 1b) but in the focal plane of a microlens array, second in the beam path, of the splitting device 4 designed as a further microlens arrangement in FIG. 1b, that is to say in the far field of the second further microlens array 17′b of the splitting device 4. The grid positions 8.1, ..., 8.N of the coherent laser beams 3.1, ..., 3.N in the focal plane form a grid arrangement 16, in which adjacent grid positions 8.1, ..., 8.N have the same distance from one another, that is to say are arranged equidistantly.

In the apparatus 1 shown in FIG. 1b, the phase setting devices 6.1, ..., 6.N are designed to set the phases $\delta\varphi_a + \Delta\varphi_a$ of the laser beams 3.1, ..., 3.N in free-beam propagation. By way of example, the phase setting devices 6.1, ..., 6.N can be electro-optic or acousto-optic modulators or deflectors. In the case of the apparatus 5 shown in FIG. 1b, the control device 15 also serves to control the phase setting devices 6.1, ..., 6.N. The active control of the phases $\delta\varphi_a + \Delta\varphi_a$ of the laser beams 3.1, ..., 3.N described in the context of FIG. 1a can be dispensed with in the apparatus 5 shown in FIG. 1b, at least in the case where the radiant fluxes of the laser beams 3.1, ..., 3.N are not too high, that is to say the control device 15 can set the (static) target phases $\delta\varphi_a + \Delta\varphi_a$ at the phase setting devices 6.1, ..., 6.N without corrections being required. On account of the non-required active phase adjustment or control, the deflection of the laser beam or the combined laser beams 12, 12a,b can be quicker in the case of the apparatus 5 than in the case for the apparatus 5 shown in FIG. 1a.

FIG. 1c shows a laser system 1 which has the same form as that of FIG. 1b, with the laser system 1 of FIG. 1c comprising a further apparatus 5′ for combining a plurality N of further laser beams 3.1′, ..., 3.N′, instead of the amplifier 7 shown in FIG. 1b, for the purposes of amplifying the seed laser beam 2a, the further apparatus being designed analogously to the apparatus 5 shown in FIG. 1a. The seed laser beam 2a is fed to the further apparatus 5′ as an input laser beam 9′, and is split into a number N of further coherent laser beams 3.1′, ..., 3.N′ by means of a further 1-to-N splitting device 4′. The number N of further coherent laser beams 3.1, ..., 3.N run through a corresponding number N of further phase setting devices 6.1′, ..., 6.N′, which allow a respective individual (fundamental) phase $\delta\varphi_a$ of the further coherent laser beams 3.1′, ..., 3.N′ (a=1, ..., N) to be set by virtue of bringing about a suitable phase lag.

After the further phase setting devices 6.1′, ..., 6.N′, the further coherent laser beams 3.1′, ..., 3.N′ run through a corresponding number N of further gain fibers 7.1′, ..., 7.N′ in order to amplify the further coherent laser beams 3.1′, ..., 3.N′. The end faces of the further gain fibers 7.1′, ..., 7.N′ serve as emission surfaces or form further grid positions 8.1′, ..., 8.N′ at which the further coherent laser beams 3.1′, ..., 3.N′ are emitted. The individual phases $\delta\varphi_a$ of the further coherent laser beams 3.1′, ..., 3.N′ are controlled with the aid of the further control device 15′ or are controlled on the basis of a detector signal of a further detector 14′, the latter detecting a component 12a′ of the further laser beam 12′ combined with the aid of the further apparatus 5′, said component being output coupled at a further output coupling device 13′.

The control device 15′ of the further apparatus 5′ shown in FIG. 1c is designed or programmed to set the individual (fundamental) phases $\delta\varphi_a$ of the further coherent laser beams 3.1′, ..., 3.N′ on the basis of an arrangement of the further grid positions 8.1′, ..., 8.N′ assigned to the respective further laser beam 3.1′, ..., 3.N′ so that the coherent further laser beams 3.1′, ..., 3.N′ are combined to form a laser beam 12′ that is diffracted into the zeroth order of diffraction. The combined laser beam 12′ forms the input laser beam 9 for the apparatus 5 for combining the coherent laser beams 3.1, ..., 3.N, which is designed as depicted in FIG. 1b. By amplifying the seed laser beam 5 in the further apparatus 5′, it is possible like in FIG. 1b to dispense with the amplification of the input laser beam 9 in the apparatus 5.

Figure 2:
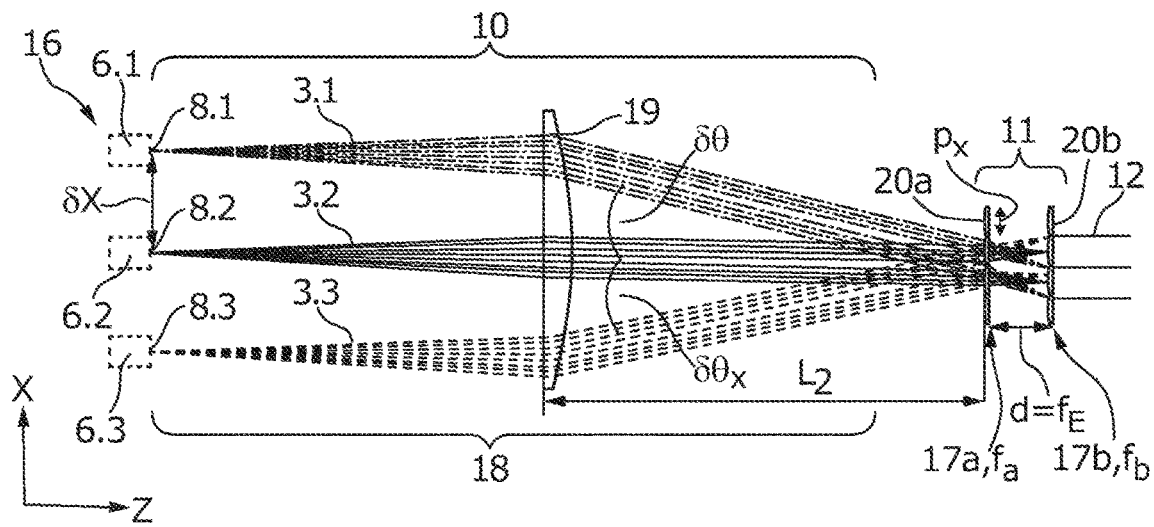
FIG. 2 shows a representation of a beam combining device of the laser system of FIGS. 1a-c, which comprises an input coupling optical unit and a microlens arrangement having two microlens arrays.

FIG. 2 shows a beam combining device 10 analogous to the apparatus 5 of FIGS. 1a-c for combining an (exemplary) number of N=3 coherent laser beams 3.1, 3.2, 3.3. The beam combining device 10 comprises a microlens arrangement 11 having two microlens arrays 17a,b, and comprises an input coupling optical unit 18. FIG. 2 likewise represents three phase setting devices 6.1, 6.2, 6.3 for adjusting the phases $\delta\varphi_1 + \Delta\varphi_1$, $\delta\varphi_2 + \Delta\varphi_2$, $\delta\varphi_3 + \Delta\varphi_3$ of the three laser beams 3.1, 3.2, 3.3, in such a way that, in combination with the input coupling optical unit 18, a phase front is formed at the microlens arrangement 11, which facilitates a coherent combination of the laser beams 3.1, 3.2, 3.3 to form the combined laser beam at 12, where possible while completely maintaining the beam quality. In this case, the grid positions 8.1, 8.2, 8.3 are arranged in a line in the X-direction and the laser beams 3.1, 3.2, 3.3 enter the input coupling optical unit 18 with a parallel alignment along a uniform propagation direction (Z-direction).

In this case, the grid positions 8.1, 8.2, 8.3 and the coherent laser beams 3.1, 3.2, 3.3 are arranged equidistantly, that is to say with the same distance δx, along the X-direction. The input coupling optical unit 18 is designed to input couple adjacent coherent laser beams 3.1, 3.2, 3.3 into the microlens arrangement 11 with a specified angle difference δθ, for which the following applies: $\delta\theta = \lambda_L/p_x$, where $\lambda_L$ denotes the (uniform) wavelength of the laser beams 3.1, 3.2, 3.3 and $p_x$ denotes a pitch of the microlenses 20a,b of a respective microlens array 17a,b in the X-direction.

To produce the angle difference δθ, the input coupling optical unit 18 comprises a focusing device in the form of a focusing lens 19, more precisely a cylindrical lens, which focuses the laser beams 3.1, 3.2, 3.3 on the microlens arrangement 11, more precisely on the first microlens array 17a of the microlens arrangement 11. To satisfy the condition in relation to the angle difference δθ, the grid positions 8.1, 8.2, 8.3 in the example shown in FIG. 2 are arranged in a one-dimensional grid arrangement 16 with the distance given by $\delta x = \lambda_L f_2/p_x$, where $f_2$ denotes a focal length of the focusing lens 19, which in FIG. 2 is arranged at a distance L2 from the microlens arrangement 11. In the example shown, the following applies to the distance L2: $f_2 - p_x^2/(N\lambda_L)$. In the case where the input coupling optical unit 18 comprises a further optical unit, as described for example in DE 10 2018 211 971.6 or in the PCT/EP2019/069324, the distance L2 may also correspond to the focal length $f_2$ of the focusing lens 19, that is to say the following applies: $L2 = f_2$.

As an alternative to the arrangement on a common line, the grid positions 8.1, 8.2, 8.3 may also be arranged in a one-dimensional grid arrangement 16 on a circular arc extending in the X-direction. In this case, the coherent laser beams 3.1, 3.2, 3.3 at the respective grid positions 8.1, 8.2, 8.3 are aligned with respect to one another at a respective difference angle $\delta\theta_x = \lambda_L/p_x$.

Under the assumption that the intensities of the laser beams 3.1, 3.2, 3.3 emanating from the grid positions 8.1, 8.2, 8.3 are the same, the coherently superposed laser beam 12 shown in FIG. 2 can be produced by means of the microlens arrangement 11 if the microlens arrangement 11 and the combined laser beams 3.1, 3.2, 3.3 satisfy the following equation (1):

$$N = p_x^2/(\lambda_L f_E)$$

where N denotes the number of coherent laser beams (in this case: N=3) and $f_E$ denotes the focal length of the microlens arrangement 11. Equation (1) should be observed as exactly as possible since deviations lead to a deterioration of the beam quality of the combined laser beam 12.

In the example shown, the microlenses 20a of the first microlens array 17a have a first focal length $f_a$ and the microlenses 20b of the second microlens array 17b have a second focal length $f_b$, with the following applying: $f_a = f_b$. In the example shown, the two microlens arrays 17a,b are arranged at a distance d from one another, which corresponds to the focal length $f_a$ or $f_b$ and the resultant focal length $f_E$ of the microlens arrangement 11.

The laser beams 3.1, 3.2, 3.3 that emanate from the grid positions 8.1, 8.2, 8.3 are single mode beams in the example shown, that is to say these each have a Gaussian profile. Alternatively, the laser beams 3.1, 3.2, 3.3 can have a different beam profile with an optionally reduced degree of spatial coherence, for example a donut-shaped beam profile or a top hat beam profile. To form a combined laser beam 12 with a corresponding Gaussian profile with a greater full width at half maximum from the laser beams 3.1, 3.2, 3.3 in the microlens arrangement 11, it is necessary for the laser beams 3.1, 3.2, 3.3 to be radiated on the microlens arrangement 11 with a phase front or with individual fundamental phases $\delta\varphi_a$ (that depend on the angle of incidence θ), as is specified below:

$$\delta\varphi_a = -(\pi/\lambda_L) f_E (m_a \lambda_L/p_x)^2$$

where p denotes a pitch of the microlenses of a respective microlens array, $f_E$ denotes the focal length of the microlens arrangement and $\lambda_L$ denotes the laser wavelength. The following applies for the running index $m_a$:

$$m_a = -\frac{(N+1)}{2} + a.$$

The equation for the fundamental phase $\delta\varphi_a$ specified above applies for the case where the splitting device 4 is designed as a fiber splitter or as any of the optical device, like in FIG. 1a. For the special case of the splitting device 4 shown in FIG. 1b, which is formed as a further microlens arrangement with two further microlens arrays 17'a, 17'b, the value for the fundamental phases $\delta\varphi_a$ specified in the equation above doubles.

The fundamental phase $\delta\varphi_a$ differs for each individual coherent laser beam 3.1, 3.2, 3.3 and is therefore set with the aid of the phase setting devices 6.1, 6.2, 6.3 and not with the aid of one or more optical elements of the input coupling optical unit 18, even if this would also be possible as a matter of principle.

There is a targeted deviation from the condition $\delta\varphi_a$ for the fundamental phases of the coherent laser beams 3.1, 3.2, 3.3 in the apparatus 5 shown in FIGS. 1a-c so as not to diffract the combined laser beam 12 into the zeroth order of diffraction $B_0$, in the case of which the laser beam 12 propagates along the Z-direction, as illustrated in FIG. 2, but to diffract said combined laser beam into a (at least) one order of diffraction $B_{k,x}$ (in the X-direction) that differs from the zeroth order of diffraction $B_0$ and in the case of which the laser beam propagates at an angle the Z-direction. By contrast, in the further apparatus 5' shown in FIG. 1c, the fundamental phases $\delta\varphi_a$ of the further laser beams 3.1', . . . , 3.N' are set in accordance with the aforementioned condition in order to diffract the combined laser beam 12' into the zeroth order of diffraction $B_0$.

To diffract the laser beam 12 into an order of diffraction $B_{k,x}$ in the X-direction that differs from the zeroth order of diffraction, it is necessary to set a respective additional phase $\Delta\varphi_a$ of a coherent laser beam 3.1, . . . , 3.N at an a-th grid position 8.1, . . . , 8.N (a=1, . . . , N), which additional phase is given by:

$$\Delta\varphi_a = -(2\pi/N)(a-(N+1)/2) B_{k,x}.$$

In this case N denotes, like above, the number of the grid position 8.1, . . . , 8.N that is arranged on a common line in the X-direction in a one-dimensional grid arrangement 16, and $B_{k,x}$ denotes a positive or negative integer. The number N of orders of diffraction $B_{k,x}$ (including the zeroth order of diffraction $B_0$), into which the combined laser beam 12 can be diffracted, corresponds to the number N of coherent laser beams 3.1, . . . , 3.N in the X-direction, that is to say the following applies: k=−(N−1)/2, . . . , +(N−1)/2. For the coherent superposition into the 0th order of diffraction, the respective additional phase $\Delta\varphi_a$ is added to the fundamental phase $\delta\varphi_a$ specified above.

Figure 3A:
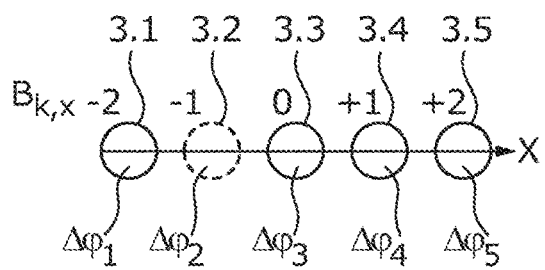
FIGS. 3a and 3b show representations of a one-dimensional arrangement of five coherent laser beams with a respective assigned additional phase for producing a single diffracted laser beam.
Figure 3B:
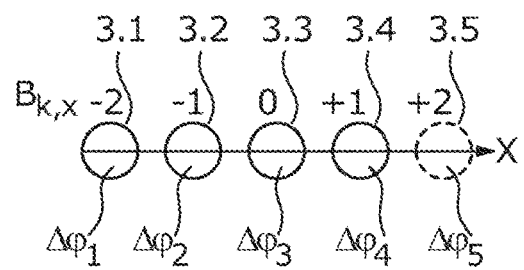
Figure 4A:
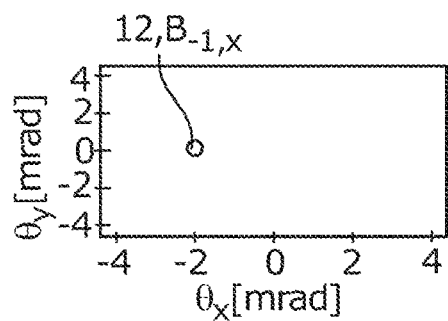
FIGS. 4a and 4b show representations of the far field of the beam combining device when using the phases shown in FIGS. 3a,b.

For the case of five coherent laser beams 3.1, . . . , 3.5, described in exemplary fashion below, the following applies to the orders of diffraction $B_{k,x}$ that differ from the zeroth order of diffraction $B_0$ and into which the laser beam 12 can be diffracted: $B_{-2,x}=-2$, $B_{-1,x}=-1$, $B_{+1,x}=+1$ and $B_{+2,x}=+2$. In FIGS. 3a,b, a respective individual additional phase $\Delta\varphi_1, \ldots, \Delta\varphi_5$ is specified for each of the five laser beams 3.1, ..., 3.5, which brings about the diffraction of the combined laser beam 12 into the −1st order of diffraction $B_{-1,x}$ (FIG. 3a) or into the +2nd order of diffraction $B_{+2,x}$ (FIG. 3b). The associated far field (angle distribution) produced by means of the beam combining device 10 is represented in FIGS. 4a,b.

To set the (individual) additional phases $\Delta\varphi_a$ of the laser beams 3.1, ..., 3.5, the phase setting devices 8.1, 8.2, 8.3 are controlled with the aid of the control device 15 such that these produce the respective correct additional phase $\Delta\varphi_a$ for the a-th coherent laser beam 3.1, ..., 3.N.

In the example shown in FIG. 3a, that is to say in the case of a number of N=5 laser beams 3.1, ..., 3.5 and a laser beam 12 that is diffracted into the −1st order of diffraction $B_{-1,x}$ in the X-direction, the following applies to the five additional phases $\Delta\varphi_1, \ldots, \Delta\varphi_5$ to be set:

$\Delta\varphi_1 = -(2\pi/5)(-1)(-1) = -4/5\pi$ $\Delta\varphi_2 = -(2\pi/5)(-1)(-1) = -2/5\pi$ $\Delta\varphi_3 = 0$ $\Delta\varphi_4 = -(2\pi/5)(1)(-1) = +2/5\pi$ $\Delta\alpha_5 = -(2\pi/5)(2)(-1) = +4/5\pi$ The additional phases $\Delta\varphi_1, \ldots, \Delta\varphi_5$ that are required to diffract the laser beam into the +2nd order of diffraction $B_{+2,k}$ are set accordingly and are represented in FIG. 3b.

To realize a discrete scanning process, in which the combined laser beam 12 is switched back and forth between different orders of diffraction $B_{k,x}$, the control device 15 can vary the respective additional phase $\Delta\varphi_a$ of the coherent laser beams 3.1, ..., 3.N by virtue of acting on the (quickly switchable) phase setting devices 6.1, ..., 6.N. By way of example, the laser beam 12 can be moved from the −1st order of diffraction $B_{-1,x}$ in the X-direction to the +2nd order of diffraction $B_{+2,x}$ in the X-direction by virtue of the additional phases $\Delta\varphi_1, \ldots, \Delta\varphi_5$ shown in FIG. 3b being set in place of the additional phases $\Delta\varphi_1, \ldots, \Delta\varphi_5$ shown in FIG. 3a.

If the far field shown in FIGS. 4a,b is imaged by means of an imaging optical unit, for example a lens, which is part of the beam shaping device 10, the angle distribution is converted into a spatial distribution. In this way, it is possible to produce an adjustable beam offset of the combined laser beam 12, that is to say the laser beam 12 can be offset by a desired distance in the X-direction, which depends on the order of diffraction $B_{k,x}$, from the optical axis that runs in the Z-direction in the center of the beam shaping device 10. In particular, the laser beam can in this case be focused on a (varying) focal position in a focal plane.

Figure 5A:
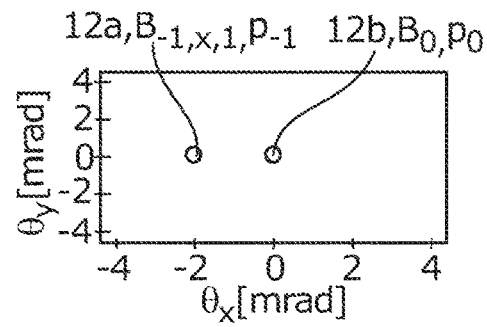
FIGS. 5a and 5b show representations of the far field of the beam combining device of FIG. 2, wherein the phases of the coherent laser beams are chosen such that the combined laser beam is diffracted into two different orders of diffraction.

FIGS. 5a,b show the far field of the beam combining device 10, in which the five coherent laser beams 3.1, ..., 3.5 are combined to form a first laser beam 12a that is diffracted into a first order of diffraction $B_{k,x,1}$ and a second laser beam 12b that is diffracted into a second order of diffraction $B_{k,x,2}$. To this end, the additional phases $\Delta\varphi_1, \ldots, \Delta\varphi_5$ of the coherent laser beams 3.1, ..., 3.5 are likewise suitably set. To set the additional (absolute) phases $\Delta\varphi_1, \ldots, \Delta\varphi_5$, it is possible to apply an iterative optimization algorithm which runs in the control device 15 or which was already implemented in advance. As a rule, phases that are suitable for certain processing processes, for example a laser cutting process, a laser welding process, a laser marking process, additive manufacturing, etc., are stored in the form of data sets or tables in the control device 15 itself or in an electronic memory connected to the latter, or such phases are specified by an operator.

Figure 4B:
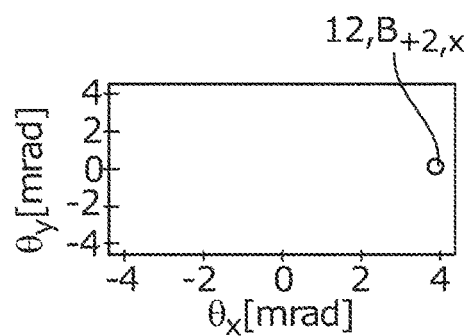

In the example shown in FIG. 5a, the additional phases $\Delta\varphi_1, \ldots, \Delta\varphi_5$ are chosen such that a first laser beam 12a is diffracted into the −1st order of diffraction $B_{-1,x,1}$, like in FIG. 4a, and, additionally, a second laser beam 12b is diffracted into the zeroth order of diffraction $B_0$. In the example shown in FIG. 5b, the first laser beam 12a is diffracted into the −1st order of diffraction $B_{-1,x,1}$, like in FIG. 4b, while the second laser beam 12b is diffracted into the +2nd order of diffraction $B_{+2,x,2}$.

In the examples shown, the intensity or the power of the first and second laser beam 12a, 12b can be of equal magnitude, that is to say the power produced by the seed laser source is divided equally among the two laser beams 12a,b. If the condition specified above for the additional phase $\Delta\varphi_a$ is observed, the input power p, which is input coupled into the beam combining device 10, is divided equally (50:50) in FIG. 5a among the laser beam 12b diffracted into the 0th order of diffraction and the laser beam 12a diffracted into the −1st order of diffraction, that is to say the following applies: $p_{-1} = p_0 = p/2$.

However, it is also possible to set the proportion of the input power p that is diffracted into the respective order of diffraction $B_{k,x,1}$, $B_{k,x,2}$ to deviate from an equal distribution in a targeted manner. In the example shown in FIG. 5a, a proportion of 80% of the input power p can be diffracted into the −1st order of diffraction and a proportion of 20% of the input power p can be diffracted into the 0th order of diffraction, that is to say, the following applies: $p_{-1} = 0.8\,p$, $p_0 = 0.2\,p$. In general, the split of the input power p among the 0th and the ±1st order of diffraction can for example be implemented as follows: $p_0 = C\,p$; $p_{\pm 1} = (1-C)\,p$, where $0 < C < 1$.

For the additional phase $\Delta\varphi_a$ of a respective coherent laser beam 3.1, ..., 3.N at an a-th grid position 8.1, ..., 8.N in the X-direction, which produces the aforementioned power distribution with a factor C, the following applies:

$\Delta\varphi a = C(2\pi/N)(a - (N+1)/2)$.

The distribution factor C can be chosen to be constant or can be varied over time by the control device 15. In the latter case, the apparatus 5 can be operated in the style of an (acousto-optic or electro-optic) modulator or deflector.

In the case of a number M of more than two combined laser beams 12a, 12b, ..., the split can for example be realized in the form of a (linear) power ramp, in the case of which a first combined laser beam is diffracted with a maximum power $p_{k,max}$ into the k-th order of diffraction and the remaining M−1 combined laser beams are diffracted into the remaining M−1 orders of diffraction with a power that has been reduced in relation to the maximum power $p_{k,max}$. By way of example, for the power distribution in the form of a power wedge, the following may apply: $a/M\,p_{k,max}$, where $a = 1, \ldots, M$. For the example of a total of 5 diffracted combined laser beams, proportions of the maximum power $p_{k,max}$ of 100%, 80%, 60%, 40% and 20% arise.

Figure 5B:
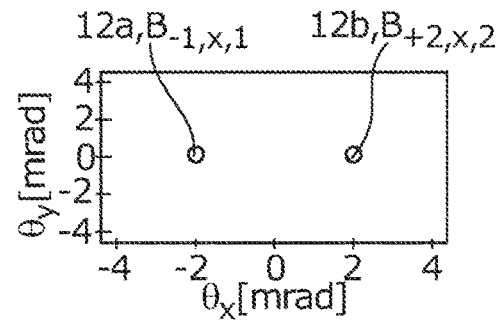

The control device 15 can also act on the phase setting devices 6.1, ..., 6.N in the example shown in FIGS. 5a,b in order to vary the additional phases $\Delta\varphi_1, \ldots, \Delta\varphi_5$ of the laser beams 3.1, ..., 3.N in order thereby to change the first order of diffraction $B_{k,x,1}$, into which the first laser beam 12a is diffracted, and the second order of diffraction $B_{k,x,2}$, into which the second laser beam 12b is diffracted. By way of example, the additional phases $\Delta\varphi_1, \ldots, \Delta\varphi_5$ can be varied such that the second laser beam 12b is diffracted from the zeroth order of diffraction $B_0$ into the +2nd order of diffraction $B_{+2,x,2}$ while the diffraction of the first laser beam 12a into the −1st order of diffraction $B_{-1,x,1}$ is maintained, and so the far field represented in FIG. 5b is produced from the far field represented in FIG. 5a. By way of a suitable choice of the additional phases $\Delta\varphi_1, \ldots, \Delta\varphi_5$ the coherent laser beams 3.1, ..., 3.5 can be combined into more than two laser beams 12a, 12b, ... which—with an equally distributed power or different powers—can be diffracted into corresponding orders of diffraction $B_{k,x,1}$, $B_{k,x,2}$, ....

Figure 6A:
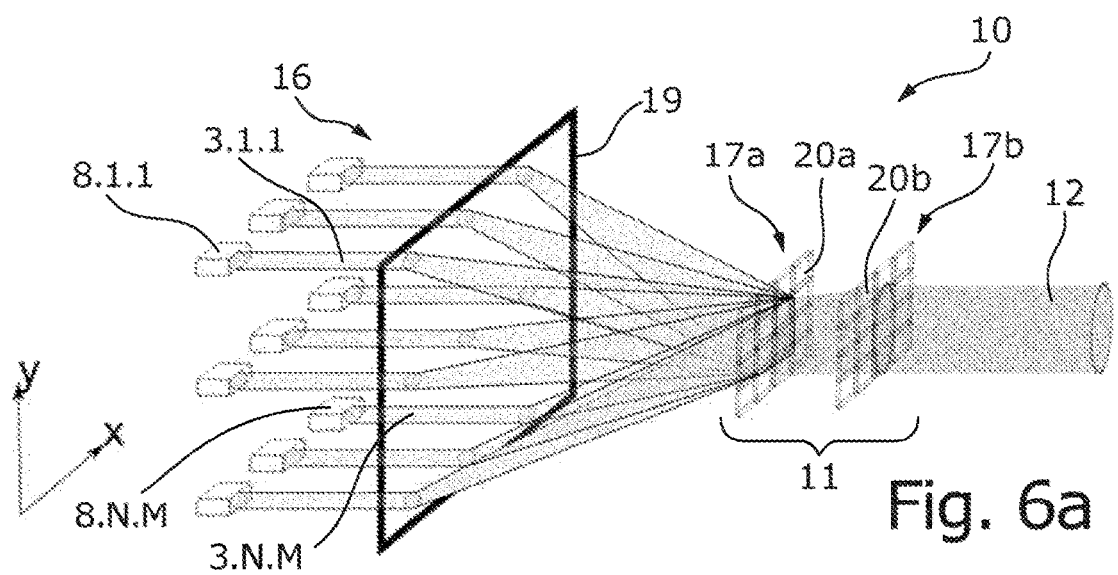
FIGS. 6a, 6b, and 6c show representations of three beam combining devices, wherein the grid positions are arranged in a two-dimensional grid arrangement in each case.
Figure 6B:
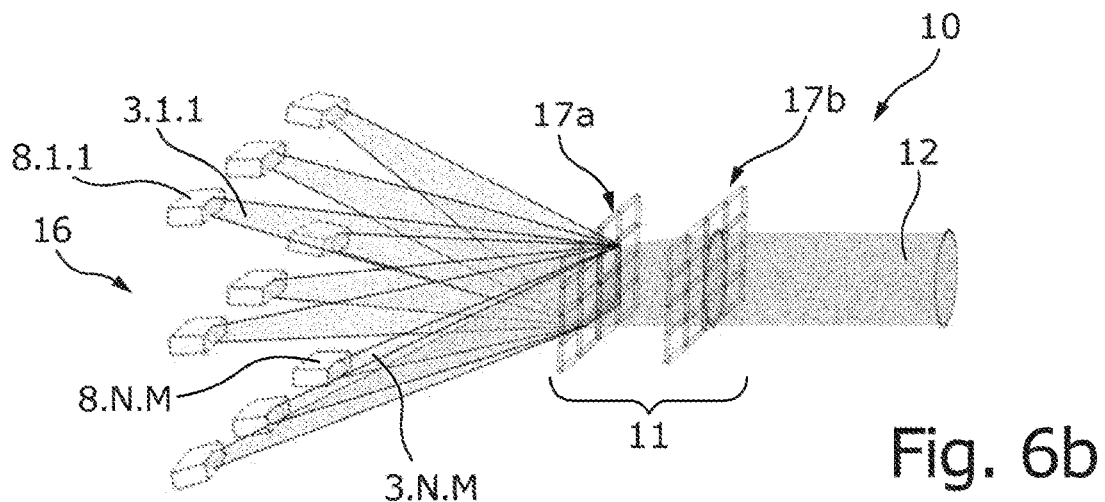
Figure 6C:
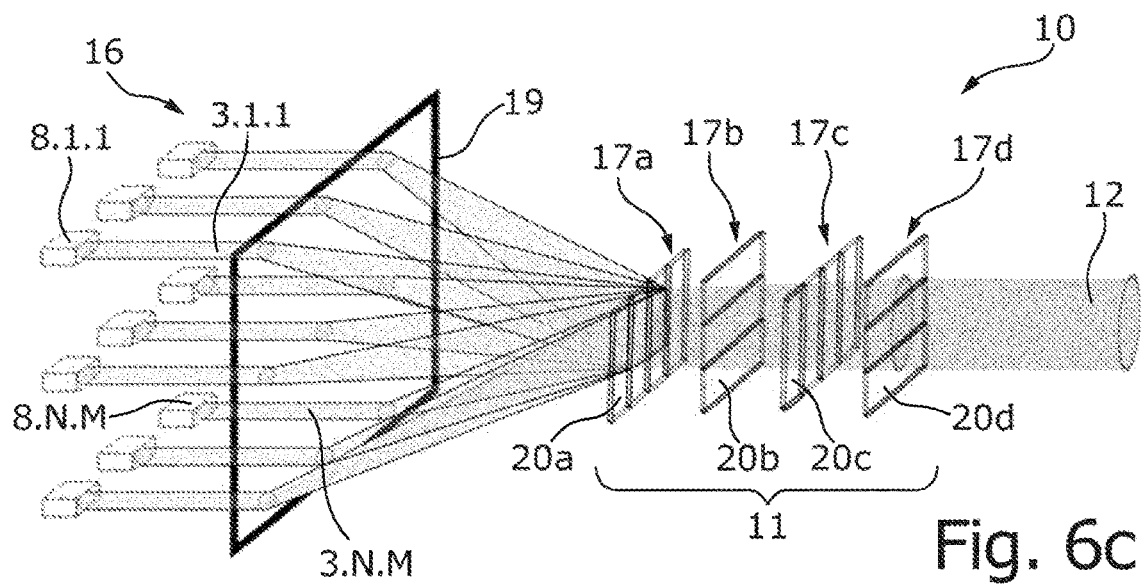

In the laser system 1 described in the context of FIGS. 1a-c to FIGS. 5a,b, the laser beams 3.1, ..., 3.N were combined one-dimensionally. FIGS. 6a-c each show an optical arrangement in which a number N (in this case: N=3)×M (in this case: M=3) of grid positions 8.1.1, ..., 8.N.M are arranged in a two-dimensional grid arrangement 16. In the example shown in FIG. 6a, the grid positions 8.1.1, ... 8.N.M are arranged in a rectangular grid arrangement 16 in a common plane (XY-plane) and the beam propagation directions of all laser beams 3.1.1, ..., 3.N.M run parallel (in the Z-direction). In a manner analogous to FIG. 2, the input coupling optical unit 18 in the optical arrangement of FIG. 6a has only one focusing device in the form of a focusing lens 19, which is represented by a square in FIG. 6a. The microlenses 20a,b of the microlens arrays 17a,b of the microlens arrangement 11 are each arranged in a corresponding, rectangular grid arrangement and are aligned parallel to the XY-plane.

In the optical arrangement shown in FIG. 6b, the grid positions 8.1.1, ..., 8.N.M are likewise arranged in a grid arrangement or in an array, the latter however extending along a curved surface, more precisely along a spherical shell, with the beam propagation directions of the laser beams 3.1.1, ..., 3.N.M being aligned perpendicular to the spherical shell and the microlens arrangement 11 being arranged in the vicinity of the center of the spherical shell. An arrangement of the grid positions 8.1.1, ..., 8.N.M in a grid arrangement 16 extending along different curved surface, for example an ellipsoid, is also possible. It is possible to dispense with an input coupling optical unit 18 in this case.

FIG. 6c shows an optical arrangement analogous to figure a, in which the two 2-dimensional microlens arrays 17a,b of the microlens arrangement 11 are replaced by 4 one-dimensional microlens arrays 17a-d. The microlens arrays 17a-d each have a plurality of microlenses 20a-d in the form of cylindrical lenses, with the microlenses 20a,c of the first and third microlens array 17a,c and the microlenses 20b,d the second and fourth microlens array 17b,d being aligned perpendicular to one another, specifically in the X-direction and Y-direction, respectively.

Depending on the spacings of the grid positions or the periodicity of the grid arrangement 16 in the X-direction and/or Y-direction, it is also possible for the pitches $p_x$, $p_y$ of the microlenses 20a,b to differ from one another in the two mutually perpendicular directions X, Y. Accordingly, the microlenses 20a,b optionally have different curvatures in the X-direction and in the Y-direction, that is to say these are not cylindrical lenses. The combination of the coherent laser beams in the two linearly independent directions X, Y, which are perpendicular in the example shown, is independent as a matter of principle, that is to say the conditions or equations specified further above apply to both directions X, Y independently of one another.

Only when setting the phase of the laser beams 3.1.1, ..., 3.N.M do the contributions in the two mutually perpendicular directions add, that is to say the following applies in relation to the respective additional phase for a number N×M of laser beams 3.1.1, ..., 3.N.M arranged in a rectangular grid arrangement 16 (X-direction and Y-direction):

$$\Delta\varphi_{a,b} = -((2\pi/N)(a-(N+1)/2)B_{k,x} + (2\pi/M)(b-(M+1)/2)B_{k,y}) \quad (3)$$

where M denotes a number of the grid positions 8.1.1, ..., 8.N.M in the Y-direction and $B_{k,y}$ denotes a positive or negative integer. Accordingly, the contributions of the fundamental phases $\delta\varphi_{a,b}$ also add in the two mutually perpendicular directions X, Y.

Figure 7:
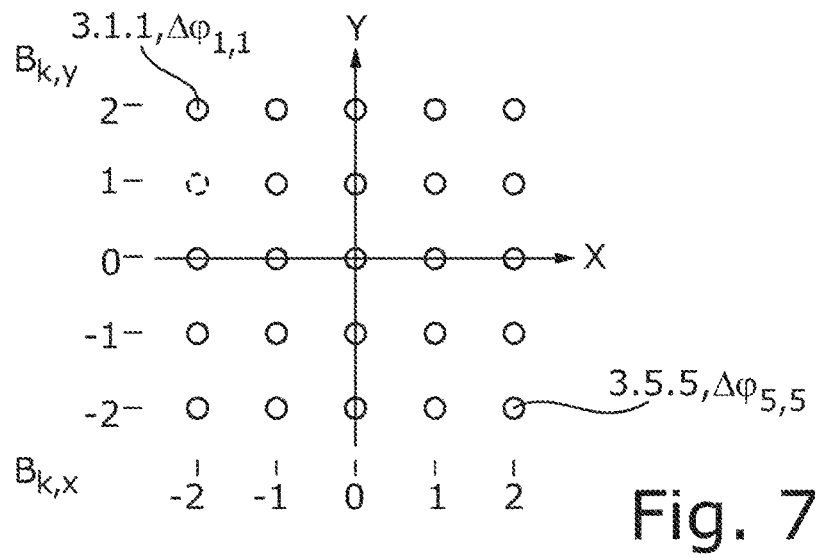
FIG. 7 shows a representation of a two-dimensional arrangement of 5×5 coherent laser beams with a respective assigned additional phase for producing a single diffracted laser beam or multiple diffracted laser beams.
Figure 8:
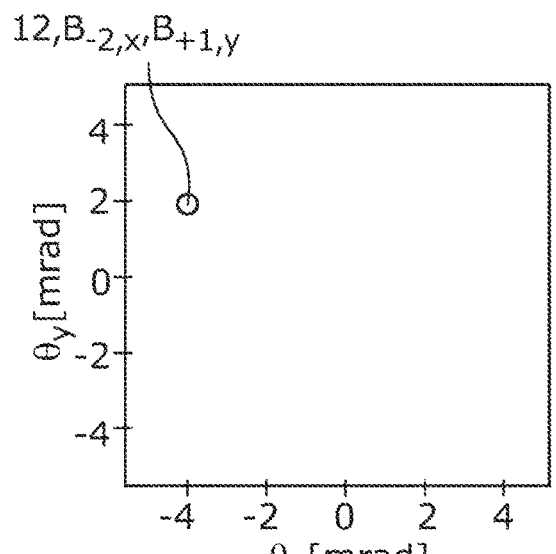
FIG. 8 shows a representation of the far field of the beam combining device, wherein the phases are chosen such that the combined laser beam is diffracted into exactly one order of diffraction.
Figure 9:
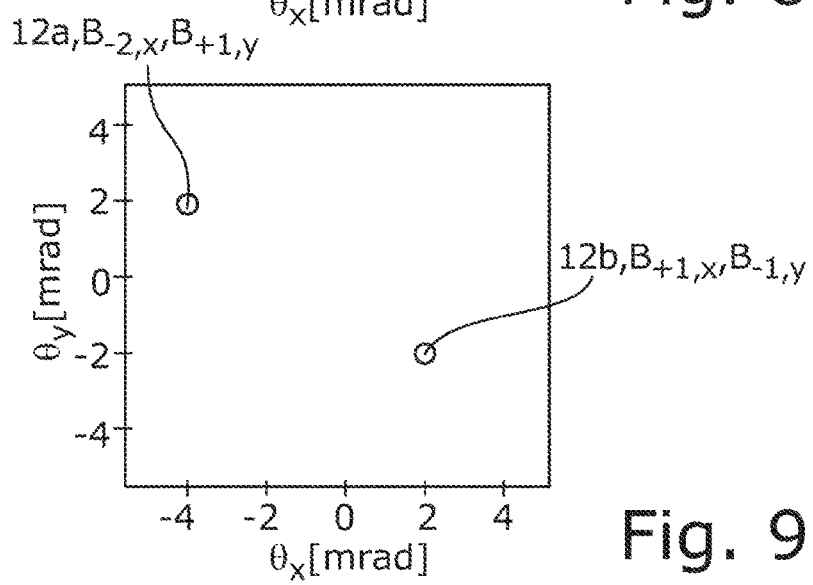
FIG. 9 shows a representations of the far field of the beam combining device, wherein the phases are chosen such that two combined laser beams are diffracted into two different orders of diffraction.

FIG. 7 shows, in a manner analogous to FIGS. 3a,b, a two-dimensional arrangement of N=5×M=5 coherent laser beams 3.1.1, ..., 3.5.5 with a respectively assigned additional phase $\Delta\varphi_{a,b}$ (a=1, ..., N; b=1, ..., M) for producing a single laser beam 12 that is diffracted into an order of diffraction $B_{-2,x}$ in the X-direction and into an order of diffraction $B_{+1,Y}$ in the Y-direction (cf. FIG. 8) or for producing a first laser beam 12a diffracted into a first order of diffraction $B_{-2,x,1}$ (in the X-direction), $B_{+1,y,1}$ (in the Y-direction) and a second laser beam 12b diffracted into second order of diffraction $B_{+1,x,2}$ (in the X-direction), $B_{-1,y,2}$ (in the Y-direction) (FIG. 9).

To produce a single laser beam 12 that is diffracted into a (two-dimensional) order of diffraction $B_{k,x}$, $B_{k,y}$, an additional phase $\Delta\varphi_{a,b}$ given by equation (3) above is set for an (a,b)-th grid position 8.a.b in the two-dimensional grid arrangement 16 (cf. FIG. 6a), that is to say for an a-th grid position in the X-direction that simultaneously forms a b-th grid position in the Y-direction, or for an (a,b)-th coherent laser beam 3.a.b (cf. FIG. 7).

Accordingly, the respective additional phases $\Delta\varphi_{a,b}$ are also set with the aid of an iterative, stochastic optimization algorithm in the far field represented in FIG. 9 in order to produce the first laser beam 12a that is diffracted into a first order of diffraction $B_{-2,x,1}$ (X-direction), $B_{+1,y,1}$ (Y-direction) and the second laser beam 12b that is diffracted into the second order of diffraction $B_{+1,x,2}$ (X-direction), $B_{-1,y,2}$ (Y-direction).

As described further above, the number and arrangement of the laser beams 12a, 12b, ... that are diffracted into the orders of diffraction $B_{k,x,1}$, $B_{k,y,1}$; $B_{k,x,2}$, $B_{k,y,2}$, ... are as desired as a matter of principle and are only restricted by the number N and/or M of the coherent laser beams 3.a.b used for the combination. By way of a suitable choice of variation of the additional phases $\Delta\varphi_a$ in a one-dimensional grid arrangement 16 or of the additional phases $\Delta\varphi_{a,b}$ in a two-dimensional grid arrangement 16, it is possible, in a targeted manner, to activate or deactivate individual combined laser beams, groups of combined laser beams or an entire array of combined laser beams, which corresponds to set diffraction orders.

Using the above-described laser system 1, it is therefore possible to obtain a (discrete) one-dimensional or two-dimensional scanning process or a targeted beam deflection and/or targeted split of the combined laser beam 12 among two or more laser beams 12a, 12b. The combined laser beam(s) 12, 12a,b can be imaged or focused on (a) (varying) focal position(s) in a focal plane with the aid of an optical unit, for example a lens, not depicted here.

While subject matter of the present disclosure has been illustrated and described in detail in the drawings and foregoing description, such illustration and description are to be considered illustrative or exemplary and not restrictive.

Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An apparatus for combining a plurality of coherent laser beams, the apparatus comprising:
   a splitting device configured to split an input laser beam into the plurality of coherent laser beams,
   a plurality of phase setting devices configured to adjust a respective phase of one of the plurality of coherent laser beams,
   a beam combining device configured to combine the plurality of coherent laser beams, which emanate from a plurality of grid positions of a grid arrangement, the beam combining device comprising a microlens arrangement having at least two microlens arrays, and
   a controller configured to:
   adjust a respective phase of a respective one of the plurality of coherent laser beams on the basis of an arrangement of the plurality of respective grid position within the grid arrangement in order to combine the plurality of coherent laser beams to form at least one combined laser beam that is diffracted into an order of diffraction that differs from the zeroth order of diffraction, and/or
   vary a respective phase of a respective one of the plurality of coherent laser beams based on an arrangement of the plurality of respective grid position within the grid arrangement in order to change an order of diffraction into which at least one combined laser beam is diffracted,
   wherein the controller is configured to adjust the respective phase of the respective one of the plurality of coherent laser beams, the respective phase being composed of a respective fundamental phase, at which the beam combining device combines the plurality of coherent laser beams to form a single laser beam that is diffracted into the zeroth order of diffraction or into an order of diffraction that differs from the zeroth order of diffraction, and a respective additional phase,
   wherein the plurality of grid positions are arranged in a first direction, and
   wherein the controller is configured, for the purposes of combining the plurality of coherent laser beams to form the single combined laser beam that is diffracted into an order of diffraction $B_{k,x}$ in the first direction that differs from the zeroth order of diffraction, to set the respective additional phase $\Delta\varphi_a$ of a coherent laser beam at an a-th grid position in the first direction which is given by:

$$\Delta\varphi_a = -(2\pi/N)(a-(N+1)/2)B_{k,x},$$

where N denotes a number of the grid positions arranged in the first direction and $B_{k,x}$ denotes a positive or negative integer.

2. The apparatus as claimed in claim 1, wherein the plurality of grid positions in the grid arrangement are additionally arranged in a second direction that is preferably perpendicular to the first direction and wherein the controller is configured, for the purposes of combining the plurality of coherent laser beams to form a single combined laser beam that is diffracted into the order of diffraction Bk,x in the first direction that differs from the zeroth order of diffraction and into an order of diffraction $B_{k,y}$ in the second direction that the differs from the zeroth order of diffraction, to set an additional phase $\Delta\varphi_{a,b}$ of a coherent laser beam at an a-th grid position in the first direction and at a b-th grid position in the second direction which is given by:

$$\Delta\varphi_{a,b} = -((2\pi/N)(a-(N+1)/2)B_{k,x}+(2\pi/M)(b-(M+1)/2)B_{k,y})$$

where M denotes a number of the grid positions in the second direction and $B_{k,y}$ denotes a positive or negative integer.

3. The apparatus as claimed in claim 1, wherein the splitting device for splitting an input laser beam into the plurality of coherent laser beams is designed as a further microlens arrangement, wherein the controller is configured, for the purposes of combining the plurality of coherent laser beams to form a single combined laser beam that is diffracted into an order of diffraction $B_{k,x}$ in the first direction that differs from the zeroth order of diffraction and that is diffracted into an order of diffraction $B_{k,y}$ in the second direction that differs from the zeroth order of diffraction, to set twice as much as the fundamental phases.

4. The apparatus as claimed in claim 1, wherein the controller is configured to vary the respective additional phase of the plurality of coherent laser beams to change a first order of diffraction, into which a first combined laser beam is diffracted, and/or to change a second order of diffraction, into which a second combined laser beam is diffracted.

5. The apparatus as claimed in claim 1, wherein the controller is configured to adjust a respective additional phase of the plurality of coherent laser beams to produce specified powers of at least two combined laser beams that are diffracted into different orders of diffraction.

6. The apparatus as claimed in claim 1, wherein the plurality of grid positions in the grid arrangement are arranged in a first direction, with the coherent laser beams and the microlens arrangement satisfying the following condition:

$$N = p_x^2/(\lambda_L f_E),$$

where N denotes a number of the grid positions arranged in the first direction, $p_x$ denotes a pitch of the microlenses of a respective microlens array in the first direction, $\lambda_L$ denotes the laser wavelength, and $f_E$ denotes a focal length of the microlens arrangement.

7. The apparatus as claimed in claim 1, wherein the apparatus is configured to input couple coherent laser beams that are adjacent in the first direction into the microlens arrangement with a specified angle difference $\delta\theta_x$, for which the following applies:

$$\delta\theta_x = \Delta_L/p_x,$$

where $\lambda_L$ denotes the laser wavelength and $p_x$ denotes a pitch of the microlenses of a respective microlens array in the first direction.

8. The apparatus as claimed in claim 1, further comprising: an input coupling optical unit configured to input couple the coherent laser beams into the microlens arrangement, the input coupling optical unit comprising at least one focusing device configured to focus the plurality of coherent laser beams onto the microlens arrangement.

9. The apparatus as claimed in claim 8, wherein the plurality of grid positions that are adjacent in the first direction are arranged in a line and have a distance $\delta x$ from one another which is given by:

$$\delta x = \lambda_L f_2/p_x,$$

where $\lambda_L$ denotes the laser wavelength, $f_2$ denotes the focal length of the focusing device, and p denotes a pitch of the microlenses of a respective microlens array in the first direction.

10. A laser system, comprising:
a seed laser source for producing a seed laser beam, and
an apparatus as claimed in claim 1,
wherein the seed laser beam is configured to form the input laser beam of the splitting device of the apparatus as claimed in claim 1.

11. The laser system as claimed in claim 10, further comprising:
a further apparatus for combining a plurality of further coherent laser beams, comprising:
a further splitting device configured to split the seed laser beam into the plurality of further coherent laser beams,
a plurality of further phase setting devices configured to adjust a respective phase of one of the further coherent laser beams, and
a further beam combining device configured to combine the further coherent laser beams emanating from a plurality of further grid positions of a further grid arrangement, with the further beam combining device comprising a further microlens arrangement having at least two further microlens arrays, and a further controller configured to adjust the respective phase of one of the further coherent laser beams on the basis of an arrangement of the respective further grid positions within the further grid arrangement in order to combine the coherent further laser beams to form a laser beam that is diffracted into the zeroth order of diffraction or into an order of diffraction that differs from the zeroth order of diffraction, the diffracted laser beam forming the input laser beam of the splitting device of the apparatus.

12. A method for combining a plurality of coherent laser beams, the method comprising:
input coupling a plurality of coherent laser beams emanating from a plurality of grid positions arranged in a grid arrangement into a microlens arrangement having at least two microlens arrays,
combining the coherent laser beams in the microlens arrangement,
adjusting a respective phase of one of the coherent laser beams based on an arrangement of the respective grid positions within the grid arrangement for the purposes of combining the plurality of coherent laser beams to form at least one combined laser beam that is diffracted into an order of diffraction that differs from the zeroth order of diffraction, and/or varying respective phases of the coherent laser beams based on an arrangement of the respective grid positions within the grid arrangement in order to change an order of diffraction into which the at least one combined laser beam is diffracted.

13. The method as claimed in claim 12, further comprising:
varying a respective additional phase of the coherent laser beams to change a first order of diffraction, into which a first combined laser beam is diffracted, and/or to change a second order of diffraction, into which a second combined laser beam is diffracted, proceeding from a respective fundamental phase at which the beam combining device combines the coherent laser beams to form a single laser beam that is diffracted into the zeroth order of diffraction or into an order of diffraction that differs from the zeroth order of diffraction.

14. The method as claimed in claim 12, further comprising: adjusting a respective additional phase of the coherent laser beams for the purposes of producing specified powers of at least two combined laser beams that are diffracted into different orders of diffraction proceeding from a respective fundamental phase,
wherein the beam combining device combines the coherent laser beams to form a single laser beam that is diffracted into the zeroth order of diffraction or into an order of diffraction that differs from the zeroth order of diffraction.

15. An apparatus for combining a plurality of coherent laser beams, the apparatus comprising:
a splitting device configured to split an input laser beam into the plurality of coherent laser beams,
a plurality of phase setting devices configured to adjust a respective phase of one of the plurality of coherent laser beams,
a beam combining device configured to combine the plurality of coherent laser beams, which emanate from a plurality of grid positions of a grid arrangement, the beam combining device comprising a microlens arrangement having at least two microlens arrays, and
a controller configured to vary a respective phase of a respective one of the plurality of coherent laser beams based on an arrangement of the plurality of respective grid positions within the grid arrangement in order to change an order of diffraction into which at least one combined laser beam is diffracted.

16. The apparatus as claimed in claim 15, wherein the controller is configured to adjust the respective phase of the respective one of the plurality of coherent laser beams, the respective phase being composed of a respective fundamental phase, at which the beam combining device combines the plurality of coherent laser beams to form a single laser beam that is diffracted into the zeroth order of diffraction or into an order of diffraction that differs from the zeroth order of diffraction, and a respective additional phase.

17. The apparatus as claimed in claim 16, wherein the plurality of grid positions are arranged in a first direction, and
wherein the controller is configured, for the purposes of combining the plurality of coherent laser beams to form the single combined laser beam that is diffracted into an order of diffraction $B_{k,x}$ in the first direction that differs from the zeroth order of diffraction, to set the respective additional phase $\Delta\varphi_a$ of a coherent laser beam at an a-th grid position in the first direction which is given by:

$$\Delta\varphi_a = -(2\pi/N)(a-(N+1)/2)B_{k,x},$$

where N denotes a number of the grid positions arranged in the first direction and $B_{k,x}$ denotes a positive or negative integer.

18. A laser system, comprising:
a seed laser source for producing a seed laser beam, and
an apparatus as claimed in claim 15,
wherein the seed laser beam is configured to form the input laser beam of the splitting device of the apparatus as claimed in claim 15.

19. The laser system as claimed in claim 18, further comprising:
a further apparatus for combining a plurality of further coherent laser beams, comprising:
a further splitting device configured to split the seed laser beam into the plurality of further coherent laser beams, a plurality of further phase setting devices configured to adjust a respective phase of one of the further coherent laser beams, and
a further beam combining device configured to combine the further coherent laser beams emanating from a plurality of further grid positions of a further grid arrangement, with the further beam combining device comprising a further microlens arrangement having at least two further microlens arrays, and a further controller configured to adjust the respective phase of one of the further coherent laser beams on the basis of an arrangement of the respective further grid positions within the further grid arrangement in order to combine the coherent further laser beams to form a laser beam that is diffracted into the zeroth order of diffraction or into an order of diffraction that differs from the zeroth order of diffraction, the diffracted laser beam forming the input laser beam of the splitting device of the apparatus.

* * * * *